(12) United States Patent
Oshita

(10) Patent No.: US 12,526,004 B2
(45) Date of Patent: Jan. 13, 2026

(54) HIGH-FREQUENCY MODULE AND COMMUNICATION DEVICE

(71) Applicant: Murata Manufacturing Co., Ltd., Kyoto (JP)

(72) Inventor: Teruaki Oshita, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 522 days.

(21) Appl. No.: 18/300,453

(22) Filed: Apr. 14, 2023

(65) Prior Publication Data

US 2023/0253999 A1  Aug. 10, 2023

Related U.S. Application Data

(63) Continuation of application No. PCT/JP2021/042052, filed on Nov. 16, 2021.

(30) Foreign Application Priority Data

Nov. 25, 2020 (JP) .................................. 2020-195399

(51) Int. Cl.
*H04B 1/16* (2006.01)
*H04B 1/18* (2006.01)

(52) U.S. Cl.
CPC ............. *H04B 1/1607* (2013.01); *H04B 1/18* (2013.01)

(58) Field of Classification Search
CPC ........... H01L 2224/16225; H01L 23/00; H01L 23/12; H01L 25/00; H01L 25/04;
(Continued)

(56) References Cited

U.S. PATENT DOCUMENTS

2019/0326191 A1  10/2019  Kondo et al.
2020/0203291 A1  6/2020  Uejima
(Continued)

FOREIGN PATENT DOCUMENTS

JP  2004-128288 A  4/2004
JP  2015-018987 A  1/2015
(Continued)

OTHER PUBLICATIONS

International Search Report for PCT/JP2021/042052 dated Feb. 15, 2022.

*Primary Examiner* — Nader Bolourchi
(74) *Attorney, Agent, or Firm* — McDonald Hopkins LLC

(57) ABSTRACT

To provide a high-frequency module that can be reduced in size while securing an external connection member. A high-frequency module includes a mounting substrate, an electronic component, and a resin layer. The electronic component is mounted on a main surface of the mounting substrate. The resin layer is provided on the mounting substrate and covers a side surface of the electronic component. The electronic component includes a connection terminal, a conductor layer, and a through-via. The connection terminal is provided on a main surface of the electronic component on the mounting substrate side, and is connected to the mounting substrate through a connection member. The conductor layer is provided on a main surface of the electronic component on a side opposite to the mounting substrate side. The through-via penetrates between the main surface and the main surface of the electronic component to connect the connection terminal and the conductor layer.

20 Claims, 10 Drawing Sheets

(58) Field of Classification Search
CPC ....... H01L 25/065; H01L 25/07; H01L 25/18;
H01L 2924/00012; H01L 2924/181;
H01L 2924/18161; H01L 2924/19105;
H04B 1/1607; H04B 1/18; H04B 1/38
See application file for complete search history.

(56) References Cited

U.S. PATENT DOCUMENTS

| | | |
|---|---|---|
| 2020/0235772 A1 | 7/2020 | Naniwa |
| 2021/0099190 A1 | 4/2021 | Uejima |
| 2021/0151397 A1 | 5/2021 | Naniwa et al. |
| 2021/0226652 A1 | 7/2021 | Matsumoto et al. |
| 2022/0231390 A1* | 7/2022 | Uemichi .................. H05K 1/02 |

FOREIGN PATENT DOCUMENTS

| | | |
|---|---|---|
| JP | 2019-192729 A | 10/2019 |
| JP | 2020-102693 A | 7/2020 |
| JP | 2020-120185 A | 8/2020 |
| WO | 2019/244815 A1 | 12/2019 |
| WO | 2020/071021 A1 | 4/2020 |
| WO | 2020/090557 A1 | 5/2020 |

* cited by examiner

HIGH-FREQUENCY MODULE AND COMMUNICATION DEVICE

CROSS REFERENCE TO RELATED APPLICATION

This is a continuation of International Application No. PCT/JP2021/042052 filed on Nov. 16, 2021 which claims priority from Japanese Patent Application No. 2020-195399 filed on Nov. 25, 2020. The contents of these applications are incorporated herein by reference in their entireties.

BACKGROUND OF THE DISCLOSURE

Field of the Disclosure

The present disclosure relates to a high-frequency module and a communication device, and particularly to a high-frequency module in which an electronic component is mounted on a mounting substrate, and a communication device including the high-frequency module.

Description of the Related Art

The high-frequency module described in Patent Document 1 includes a module substrate (mounting substrate), a filter (electronic component), a semiconductor IC (electronic component), a plurality of columnar electrodes (external connection members), and a resin member (resin layer). The filter is mounted on a first main surface of the module substrate, and the semiconductor IC and the plurality of columnar electrodes are mounted on a second main surface opposite to the first main surface in the module substrate. The resin member is provided on the first main surface and the second main surface of the module substrate so as to cover the filter and the semiconductor IC and to cover the columnar electrodes except for the tip surface thereof.

Patent Document 1: International Publication No. 2020/071021

BRIEF SUMMARY OF THE DISCLOSURE

The high-frequency module as described above is required to be reduced in size, however, when the module is reduced in size, there may be a case where the external connection member (columnar electrode) is not secured.

A possible benefit of the present disclosure is to provide a high-frequency module and a communication device that can be reduced in size while securing an external connection member.

A high-frequency module of an aspect of the present disclosure includes a mounting substrate, an electronic component, and a resin layer. The mounting substrate has a first main surface and a second main surface facing each other. The electronic component is mounted on the first main surface of the mounting substrate. The resin layer is provided on the mounting substrate and covers a side surface of the electronic component. The electronic component includes at least one connection terminal, a conductor layer, and a through-via. The at least one connection terminal is provided on the third main surface of the electronic component on the mounting substrate side and is connected to the mounting substrate through a connection member. The conductor layer is provided on the fourth main surface of the electronic component on a side opposite to the mounting substrate side. The through-via penetrates between the third main surface and the fourth main surface to connect the connection terminal and the conductor layer.

A communication device of an aspect of the present disclosure includes the high-frequency module and a signal processing circuit. The signal processing circuit is connected to the high-frequency module and performs signal processing on a high-frequency signal.

According to the present disclosure, there is an advantage in that miniaturization is possible while securing an external connection member.

DETAILED DESCRIPTION OF THE DISCLOSURE

Figure 1:
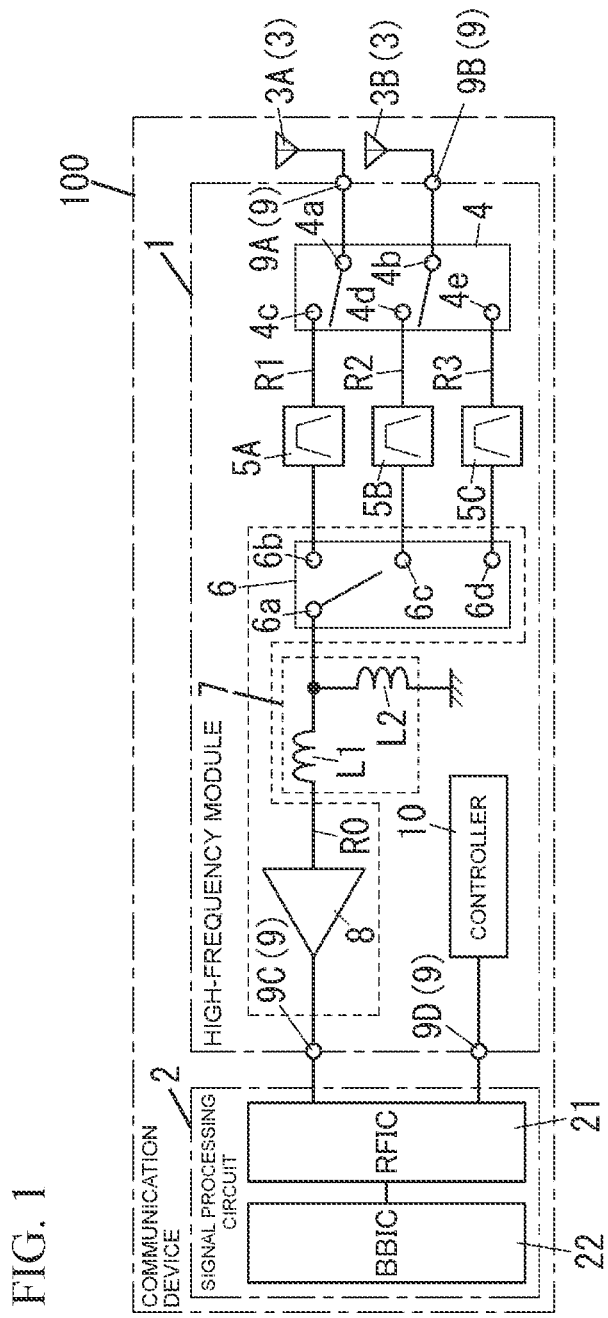
FIG. 1 is a block diagram of a high-frequency module and a communication device according to Embodiment 1.

FIG. 1 to FIG. 13 referred to in the following embodiments and the like are all schematic diagrams, and the respective ratios of the size and thickness of each constituent element in the drawings do not necessarily reflect the actual dimensional ratios.

Embodiment 1

(1) Overview

Figure 2:
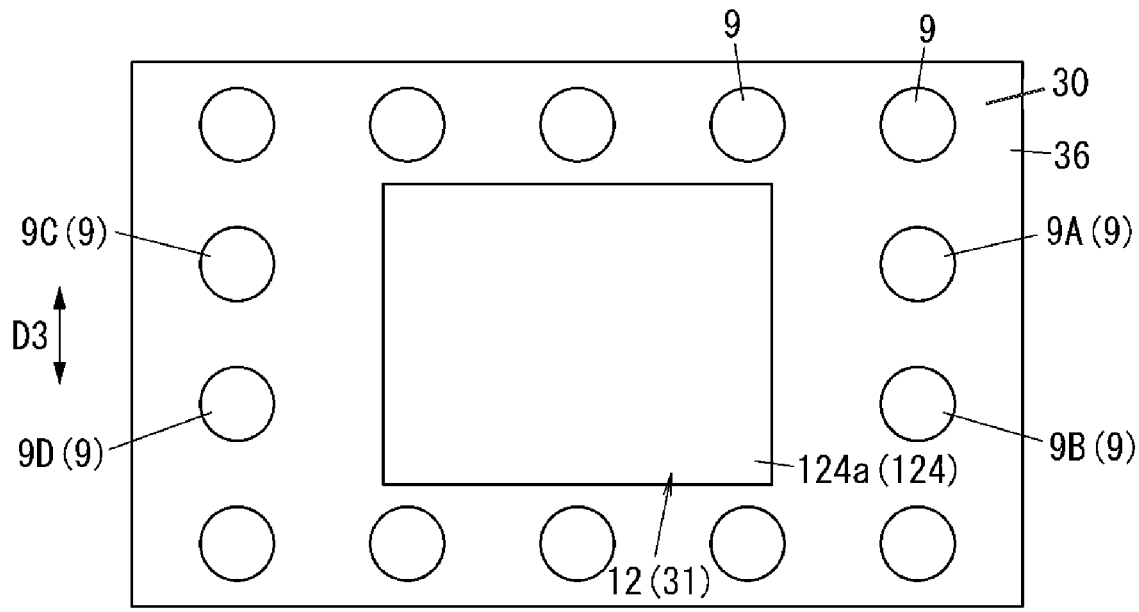
FIG. 2 is a plan view of the above high-frequency module.
Figure 3:
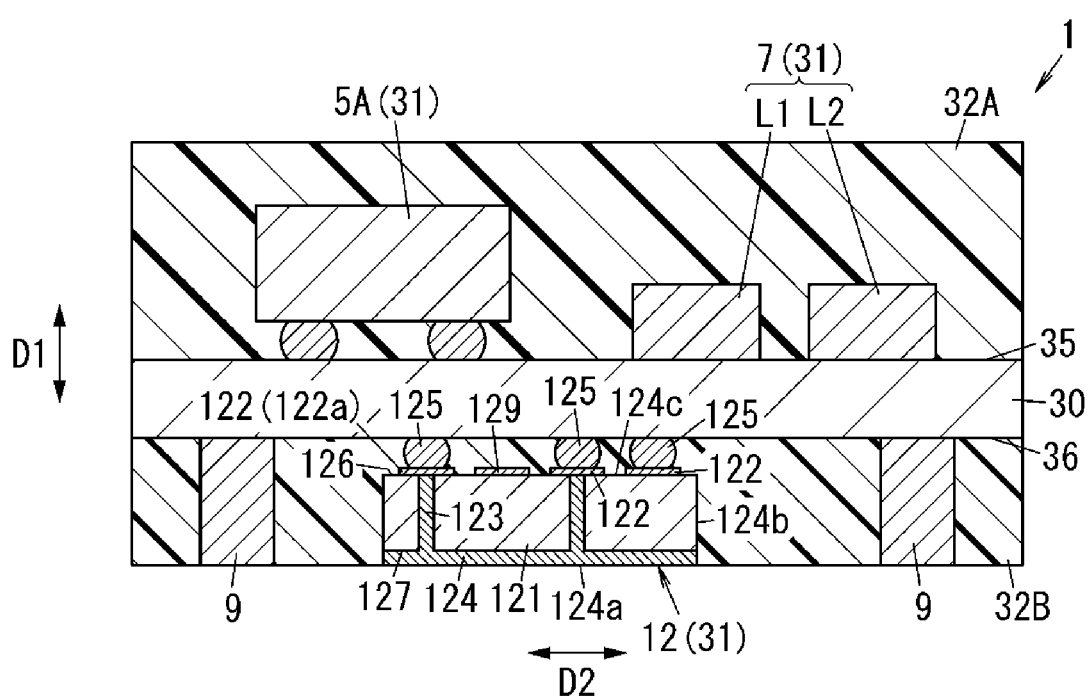
FIG. 3 is a cross-sectional view of the above high-frequency module.

As illustrated in FIG. 2 and FIG. 3, a high-frequency module 1 according to Embodiment 1 includes a mounting substrate 30, an IC chip 12 (electronic component), and a resin layer 32B. The mounting substrate 30 has a main surface 35 (second main surface) and a main surface 36 (first main surface) facing each other. The IC chip 12 is mounted on the main surface 36 of the mounting substrate 30. The resin layer 32B covers the side surface of the IC chip 12. The IC chip 12 includes at least one connection terminal 122, a conductor layer 124, and a through-via 123. A chip body 121 has a main surface 126 (third main surface) on the mounting substrate 30 side and a main surface 127 (fourth main surface) on the side opposite to the mounting substrate 30 side. The connection terminal 122 is provided on the main surface 126 of the chip body 121 and is connected to the mounting substrate 30 through a connection member 125. The conductor layer 124 is provided on the main surface 127 of the chip body 121. The through-via 123 penetrates the chip body 121 and connects the connection terminal 122 and the conductor layer 124.

According to this configuration, the IC chip 12 (electronic component) can also serve as an external connection member by connecting an external circuit to the conductor layer 124. Thus, by using the IC chip 12 also as the external connection member in this manner, the external connection member can be provided on the mounting substrate 30 without newly securing an arrangement space for the external connection member. As a result, the high-frequency module 1 can be reduced in size while securing the external connection member.

(2) Detailed Description

Hereinafter, the high-frequency module 1 and a communication device 100 according to Embodiment 1 will be described in detail with reference to FIG. 1 to FIG. 8C.

(2-1) Configuration of Communication Device

As illustrated in FIG. 1, the communication device 100 is a communication device that includes the high-frequency module 1. The communication device 100 is, for example, a mobile terminal (for example, a smartphone), but is not limited thereto, and may be, for example, a wearable terminal (for example, a smart watch). The high-frequency module 1 is, for example, a module compatible with the 4G (fourth generation mobile communication) standard and the 5G (fifth generation mobile communication) standard. The 4G standard is, for example, the 3GPP LTE standard (LTE: Long Term Evolution). The 5G standard is, for example, 5G NR (New Radio). The high-frequency module 1 is a module capable of supporting carrier aggregation and dual connectivity.

In addition to the high-frequency module 1, the communication device 100 includes a signal processing circuit 2 and at least one (two in the illustrated example) antenna 3A or 3B.

The high-frequency module 1 is configured to amplify reception signals (high-frequency signals) received by the antennas 3A and 3B and output the amplified reception signals to the signal processing circuit 2. The high-frequency module 1 is controlled by, for example, the signal processing circuit 2. Note that in the present embodiment, the high-frequency module 1 has a signal processing function of the reception system that amplifies reception signals received by the antennas 3A and 3B and outputs the amplified reception signals to the signal processing circuit 2. However, the high-frequency module 1 may further have a signal processing function of the transmission system that amplifies a transmission signal from the signal processing circuit 2 and outputs the amplified transmission signal to the antennas 3A and 3B.

The signal processing circuit 2 is connected to the high-frequency module 1 and is configured to perform signal processing on a reception signal received from the high-frequency module 1. Note that when the high-frequency module 1 further has a signal processing function of the transmission system, the signal processing circuit 2 is further configured to perform signal processing on a transmission signal to be outputted to the high-frequency module 1.

The signal processing circuit 2 includes an RF signal processing circuit 21 and a baseband signal processing circuit 22.

The RF signal processing circuit 21 is, for example, a radio frequency integrated circuit (RFIC), and performs signal processing on a high-frequency signal (reception signal). For example, the RF signal processing circuit 21 performs signal processing such as down-conversion on the reception signal received from the high-frequency module 1 and outputs the reception signal to the baseband signal processing circuit 22. Note that when the high-frequency module 1 further has the signal processing function of the transmission system, the RF signal processing circuit 21 further performs signal processing such as up-conversion on the transmission signal outputted from the baseband signal processing circuit 22 and outputs the transmission signal to the high-frequency module 1.

The baseband signal processing circuit 22 is, for example, a baseband integrated circuit (BBIC). The baseband signal processing circuit 22 outputs the reception signal received from the RF signal processing circuit 21 to the outside. The output signal (reception signal) is used, for example, for image display as an image signal or for communication as an audio signal. Note that when the high-frequency module 1 further has the signal processing function of the transmission system, the baseband signal processing circuit 22 further generates a transmission signal from a baseband signal (for example, an audio signal and an image signal) inputted from the outside and outputs the generated transmission signal to the RF signal processing circuit 21.

(2-2) Circuit Configuration of High-Frequency Module

The high-frequency module 1 is, for example, a reception-system module (specifically, a diversity module) that receives a reception signal. However, the high-frequency module 1 may be a transmission-system module that transmits a transmission signal, or may be a transmission/reception-system module that performs both the transmission of a transmission signal and the reception of a reception signal.

As illustrated in FIG. 1, the high-frequency module 1 transmits high-frequency signals (for example, reception signals) between the antennas 3A and 3B and the signal processing circuit 2.

The high-frequency module 1 includes a first switch 4, a plurality of (three in the illustrated example) reception filters 5A to 5C, a second switch 6, a matching circuit 7, a low noise amplifier 8, a plurality of (four in the illustrated example) external connection members 9, and a controller 10. In addition, the high-frequency module 1 includes a plurality of (three in the illustrated example) signal paths R0 to R3 for reception signals.

The plurality of external connection members 9 includes antenna terminals 9A and 9B, a signal output terminal 9C, and an input terminal 9D. The antenna terminals 9A and 9B are terminals to which the antennas 3A and 3B are connected, respectively. The signal output terminal 9C is a terminal for outputting the reception signal processed by the high-frequency module 1 to the signal processing circuit 2, and is connected to an input portion of the signal processing circuit 2. The input terminal 9D is a terminal to which a control signal from the signal processing circuit 2 is inputted, and is connected to an output portion of the signal processing circuit 2.

The signal path R0 is a signal path connecting a common terminal 6a of the second switch 6 and the signal output terminal 9C. The signal path R0 is provided with the matching circuit 7 and the low noise amplifier 8. The signal paths R1 to R3 are signal paths connecting selection terminals 4c to 4e of the first switch 4 and selection terminals 6b to 6d of the second switch 6, respectively. The signal paths R1 to R3 are provided with the reception filters 5A to 5C, respectively.

The first switch 4 is a switch for selectively connecting the signal paths R1 to R3 to the antennas 3A and 3B. The first switch 4 is, for example, a switch integrated circuit (IC). The first switch 4 includes one or more (for example, two) common terminals 4a and 4b and a plurality of (in the illustrated example, three) the selection terminals 4c to 4e. The common terminals 4a and 4b are connected to the antenna terminals 9A and 9B, respectively. That is, the common terminals 4a and 4b are connected to the antennas 3A and 3B through the antenna terminals 9A and 9B. The three selection terminals 4c to 4e are connected to the three signal paths R1 to R3, respectively. That is, the three selection terminals 4c to 4e are connected to the three selection terminals 6b to 6d of the second switch 6 through the signal paths R1 to R3, respectively.

The first switch 4 selects a connection destination of the two common terminals 4a and 4b (that is, a connection destination of the antennas 3A and 3B) from the three selection terminals 4c to 4e (that is, the three signal paths R1 to R3) in accordance with a control signal from the controller 10. The first switch 4 is, for example, a switch that performs one-to-one connection.

The second switch 6 is a switch for selecting a signal path used for the reception of a reception signal from the signal paths R1 to R3. The second switch 6 is, for example, a switch IC. The second switch 6 includes the common terminal 6a and the plurality of (three in the illustrated example) selection terminals 6b to 6d. The common terminal 6a is connected to the signal path R0. The common terminal 6a is connected to the signal output terminal 9C through the signal path R0. The three selection terminals 6b to 6d are connected to the three signal paths R1 to R3, respectively. The three selection terminals 6b to 6d are connected to the selection terminals 4c to 4e of the first switch through the signal paths R1 to R3, respectively.

The second switch 6 selects a connection destination of the common terminal 6a from the three selection terminals 6b to 6d according to a control signal from the controller 10. Thus, the signal path used for the reception of the reception signal is selected from the signal paths R1 to R3 by the second switch 6. The second switch 6 is, for example, a switch that performs one-to-one or one-to-two connection.

The reception filters 5A to 5C are provided in the signal paths R1 to R3, respectively. The reception filters 5A to 5C are filters that use reception bands (communication bands) of mutually different communication bands (for example, first to third communication bands) as pass bands. Each of the reception filters 5A to 5C includes an input portion and an output portion. The input portions of the reception filters 5A to 5C are connected to the selection terminals 4c to 4e of the first switch 4, respectively, and the output portions of the reception filters 5A to 5C are connected to the selection terminals 6b to 6d of the second switch 6, respectively. Each of the reception filters 5A to 5C limits the reception signal inputted to the input portion to a signal in the transmission band of the first to third communication bands and outputs the limited signal from the output portion.

The reception filters 5A to 5C are, for example, acoustic wave filters. The acoustic wave filter is, for example, a surface acoustic wave (SAW) filter using a surface acoustic wave. Note that the reception filters 5A to 5C are not limited to the SAW filters and may be, for example, bulk acoustic wave (BAW) filters other than the SAW filters.

The matching circuit 7 is provided in the signal path R0. The matching circuit 7 is a circuit for achieving the impedance matching between the low noise amplifier 8 and the second switch 6, and is connected between the low noise amplifier 8 and the second switch 6. The matching circuit 7 includes, for example, two inductors L1 and L2. The inductor L1 is connected in series with the signal path R0, and the inductor L2 is connected between the signal path R0 and ground.

The low noise amplifier 8 is provided in the signal path R0. The low noise amplifier 8 has an input portion and an output portion. The input portion of the low noise amplifier 8 is connected to an output portion of the matching circuit 7 through the signal path R0, and the output portion of the low noise amplifier 8 is connected to the signal output terminal 9C. The low noise amplifier 8 amplifies the reception signal inputted to the input portion and outputs the amplified signal from the output portion. The low noise amplifier 8 is controlled by a control signal from the controller 10.

The controller 10 is a control device that controls electronic components such as the first switch 4, the second switch 6, the low noise amplifier 8 and the like in accordance with a control signal from the signal processing circuit 2. The controller 10 is electrically connected to the electronic components described above. In addition, the controller 10 is connected to the output portion of the signal processing circuit 2 through the input terminal 9D. The controller 10 controls the above-described electronic components in accordance with the control signal inputted from the signal processing circuit 2 to the input terminal 9D.

(2-3) Operation of Communication Device

The operation of the communication device 100 will be described with reference to FIG. 1.

In the following description, a case where the communication device 100 simultaneously receives reception signals by the two antennas 3A and 3B will be exemplified. The second switch 6 selects two signal paths (for example, signal paths R1 and R2) used for the reception of reception signals from the signal paths R1 to R3. The selected two signal paths R1 and R2 each are connected to the signal path R0 through the common terminal 6a by the second switch 6. In addition, the connection destinations of the two antennas 3A and 3B are connected, by the first switch 4, to the two signal paths (for example, the signal paths R1 and R2) selected by the second switch 6.

Then, respective reception signals received by the antennas 3A and 3B flow through the signal paths R1 and R2 through the first switch 4, are signal-processed by the reception filters 5A and 5B, flow into the signal path R0 through the second switch 6, and are combined. The combined reception signal flows through the signal path R0, is processed by the matching circuit 7 and the low noise amplifier 8, and is outputted from the signal output terminal 9C to the signal processing circuit 2. Then, the output reception signal is processed by the signal processing circuit 2.

(2-4) Structure of High-Frequency Module

The structure of the high-frequency module 1 will be described with reference to FIG. 2 and FIG. 3.

As illustrated in FIG. 2 and FIG. 3, the high-frequency module 1 includes the mounting substrate 30, a plurality of electronic components 31, and a resin layer 32A and the resin layer 32B.

As illustrated in FIG. 3, the mounting substrate 30 is a substrate for mounting the plurality of electronic components 31, and has, for example, a rectangular plate shape.

The mounting substrate 30 has the main surface 35 (second main surface) and the main surface 36 (first main surface) facing each other in a thickness direction D1 of the mounting substrate 30. The main surfaces 35 and 36 have, for example, a rectangular shape.

The mounting substrate 30 is, for example, a substrate (multilayer substrate) having a plurality of layers including a plurality of dielectric layers and a plurality of conductive layers. The plurality of dielectric layers and the plurality of conductive layers are laminated in the thickness direction D1 of the mounting substrate 30. The plurality of conductive layers is formed in a predetermined pattern determined for each layer. The plurality of conductive layers includes a ground layer. The mounting substrate 30 is a low temperature co-fired ceramics (LTCC) substrate, for example. The mounting substrate 30 is not limited to the LTCC substrate and may be, for example, a printed wiring board, a high temperature co-fired ceramics (HTCC) substrate, or a resin multilayer substrate.

In the following description, the thickness direction D1 of the mounting substrate 30 may be referred to as the first direction D1. In addition, a certain direction orthogonal to the first direction D1 (for example, a direction parallel to one pair of two pairs of the opposite sides of the main surface 36 of the mounting substrate 30) is referred to as a second direction D2. In addition, a direction orthogonal to both the first direction D1 and the second direction D2 (for example, a direction parallel to the other pair of the two pairs of the opposite sides of the main surface 36) is defined as a third direction D3 (see FIG. 2).

In addition, on the drawing in FIG. 3, the upper side and the lower side in the first direction D1 may be simply referred to as an "upper side" and a "lower side", and the left side and the right side in the second direction D2 may be simply referred to as a "left side" and a "right side". In addition, on the drawing in FIG. 2, the upper side and the lower side in the third direction D3 may be simply referred to as a "rear side" and a "front side".

The plurality of electronic components 31 is mounted on the main surface 35 or the main surface 36 of the mounting substrate 30. In this specification and the like, "being mounted" includes that the electronic component 31 is arranged on (mechanically connected to) the main surface 35 or the main surface 36 of the mounting substrate 30 and that the electronic component 31 is electrically connected to (an appropriate conductor portion of) the mounting substrate 30.

As illustrated in FIG. 2, the plurality of electronic components 31 includes an integrated circuit (IC) chip 12. The IC chip 12 is a semiconductor device including the second switch 6 (see FIG. 1) and the low noise amplifier 8 (see FIG. 1) in one chip. The IC chip 12 and the plurality of external connection members 9 are mounted on the main surface 36 of the mounting substrate 30. More specifically, the IC chip 12 has, for example, a rectangular shape in a plan view, and the plurality of external connection members 9 has a cylindrical shape, for example. For example, the IC chip 12 is arranged in the center of the main surface 36 of the mounting substrate 30, and the plurality of external connection members 9 is arranged in the peripheral portion of the main surface 36 of the mounting substrate 30 (that is, the outer periphery of the IC chip 12).

In addition, the plurality of electronic components 31 illustrated in FIG. 3 includes the first switch 4, the reception filters 5A to 5C, the inductors L1 and L2 of the matching circuit 7, and the controller 10 (see FIG. 1). These electronic components 31 are mounted on the main surface 35 of the mounting substrate 30. In FIG. 3, only the reception filter 5A and the inductors L1 and L2 of the matching circuit 7 are illustrated on the main surface 35 of the mounting substrate 30 as an example.

As illustrated in FIG. 3, the resin layer 32A is provided on the main surface 35 of the mounting substrate 30. The resin layer 32A covers the plurality of electronic components 31 mounted on the main surface 35 of the mounting substrate 30. The resin layer 32B is provided on the main surface 36 of the mounting substrate 30. The resin layer 32B covers the plurality of electronic components 31 mounted on the main surface 36 of the mounting substrate 30. More specifically, the resin layer 32B exposes the tip surfaces of the plurality of external connection members 9 and covers the external connection members 9 except for the tip surfaces. In addition, the resin layer 32B exposes a main surface 124a of the IC chip 12 and covers the IC chip 12 other than the main surface 124a (a side surface 124b and an upper surface 124c). The resin layers 32A and 32B contain resin. However, the resin layers 32A and 32B may contain fillers in addition to the resin. The resin layers 32A and 32B may be made of the same material or different materials from each other.

(2-5) Structure of IC Chip

In the high-frequency module 1, one or more electronic components among the plurality of electronic components 31 are also used as external connection members. In the present embodiment, as an example, the IC chip 12 is also used as an external connection member. Hereinafter, the configuration of the IC chip 12 also serving as the external connection member will be described in detail.

As illustrated in FIG. 3, the IC chip 12 includes the chip body 121, the plurality of connection terminals 122, a functional unit 129, the plurality of through-vias 123, the conductor layer 124, and the plurality of connection members 125.

The chip body 121 has, for example, a rectangular plate shape. The chip body 121 is formed of a member having an insulating property (for example, resin). The chip body 121 has the main surface 126 (third main surface) and the main surface 127 (fourth main surface) facing each other. The main surface 126 is a main surface of the chip body 121 on the mounting substrate 30 side. The main surface 127 is a main surface of the chip body 121 on a side opposite to the mounting substrate 30 side.

The conductor layer 124 is a portion connected to an external circuit (connection partner) different from the IC chip 12. The conductor layer 124 is formed of a member (for example, metal) having conductivity. The conductor layer 124 is provided on the main surface 127 of the chip body 121. In the present embodiment, the conductor layer 124 is provided on the entire main surface 127 of the chip body 121. However, the conductor layer 124 may be provided on at least a part of the main surface 127 of the chip body 121.

The functional unit 129 is a portion constituting a circuit including an integrated circuit (IC). In the present embodiment, the functional unit 129 includes each circuit of the low noise amplifier 8 (see FIG. 1) and the second switch 6 (see FIG. 1). The functional unit 129 is provided on the main surface 126 of the chip body 121. The functional unit 129 is connected to one or more (in the present embodiment, a plurality of) connection terminals 122 which are input/output terminals.

The connection terminal 122 is a portion electrically connected to the mounting substrate 30 through the connection member 125, and is, for example, a pad electrode. The plurality of connection terminals 122 includes a ground terminal and a hot terminal of the IC chip 12. The ground terminal is a terminal for grounding. The hot terminal is, for example, a terminal 122a to which a voltage is applied in order to flow a signal, and is not connected to the ground (for example, a ground layer of the mounting substrate 3).

The through-via 123 is a member that penetrates the chip body 121 in a thickness direction and electrically connects the conductor layer 124 and the connection terminal 122. That is, the through-via 123 penetrates between the main surface 126 and the main surface 127 of the IC chip 12. The through-via 123 is formed of a conductive member (for example, metal). The through-via 123 has, for example, a columnar shape. In the present embodiment, at least one (for example, a ground terminal) among the plurality of connection terminals 122 is connected to the conductor layer 124 through the through-via 123, and the rest (for example, including a hot terminal) is not connected to the conductor layer 124. That is, in the present embodiment, all the connection terminals 122 connected to the through-vias 123 are ground terminals and are electrically connected to the ground layer of the mounting substrate 30 through the connection members 125.

The connection member 125 is a conductive member that connects the connection terminal 122 and the conductive pattern provided on the main surface 36 of the mounting substrate 30, and is, for example, a bump formed of solder.

In addition, in the present embodiment, the IC chip 12 has the main surface 126 and the main surface 127, but the main surface 126 and the main surface 127 are separated from each other in the thickness direction of the IC chip 12 and intersect the thickness direction of the IC chip 12. In the example illustrated in FIG. 3, the thickness direction of the IC chip 12 is the same as the thickness direction D1 of the mounting substrate 30. The main surface 126 and the main surface 127 of the IC chip 12 are orthogonal to the thickness direction of the IC chip 12 in the example of FIG. 3, but may be, for example, surfaces that are not orthogonal to the thickness direction of the IC chip 12. In addition, the main surface 126 and the main surface 127 of the IC chip 12 may be flat surfaces or curved surfaces. In addition, the main surface 126 and the main surface 127 of the IC chip 12 may be formed with fine irregularities, concave portions, or convex portions. In a plan view from the thickness direction of the IC chip 12, the IC chip 12 has a rectangular shape, but the shape is not limited thereto and may be, for example, a square shape or a shape other than a square shape. In addition, the IC chip 12 has a rectangular shape in a side view from a direction orthogonal to the thickness direction of the IC chip 12, but the shape is not limited thereto and may be, for example, a square shape or a shape other than a square shape.

The IC chip 12 configured as described above is mounted on the main surface 36 of the mounting substrate 30 through the connection member 125. Of the outer surfaces (entire surfaces) of the IC chip 12, the main surface 124a of the conductor layer 124 is exposed by the resin layer 32A, and portions other than the main surface 124a (the side surfaces and the upper surface of the IC chip 12) are covered by the resin layer 32A.

The IC chip 12 configured as described above also functions as an external connection member in addition to its original functions (the second switch 6 and the low noise amplifier 8). That is, the conductor layer 124 of the IC chip 12 is electrically connected to the mounting substrate 30 through the through-via 123, the connection terminal 122, and the connection member 125. Therefore, when an external circuit (connection partner) is connected to the conductor layer 124, the external circuit is electrically connected to the mounting substrate 30 through the IC chip 12. Thus, by using the IC chip 12 also as the external connection member, the external connection member can be provided on the mounting substrate 30 without newly securing an arrangement space for the external connection member.

In the present embodiment, the high-frequency module 1 adopts a double-sided component mounting structure in which the electronic components 31 are mounted on the main surfaces 35 and 36 on both sides of the mounting substrate 30, thereby achieving miniaturization. In such a double-sided component mounting structure that can achieve miniaturization, it is difficult to secure the external connection member in the mounting substrate 30. However, by using the IC chip 12 also as the external connection member as in the present embodiment, the high-frequency module 1 can be reduced in size while securing the external connection member.

In the present embodiment, the conductor layer 124 of the IC chip 12 is electrically connected to the ground layer of the mounting substrate 30 through the through-via 123, the connection terminal 122, and the connection member 125. Therefore, the IC chip 12 functions as a ground terminal connected to an external ground electrode. For example, in the high-frequency module 1, the conductor layer 124 of the IC chip 12 is connected to a ground electrode (not illustrated) of the communication device 100 (that is, an electric device on which the high-frequency module 1 is mounted), so that a ground layer (not illustrated) of the mounting substrate 30 can be maintained at a ground potential. Thus, the ground terminal of the mounting substrate 30 can be secured while the miniaturization of the high-frequency module 1 is maintained. Thus, the ground of the electronic component 31 mounted on the mounting substrate 30 can be secured. As a result, the characteristics of the electronic component 31 can be stably secured. To be specific, it is possible to achieve the attenuation characteristics of the reception filters 5A to 5C, the reduction of the noise generated in digital processing circuits (switch ICs and IC chips), and the reduction of the interference between a reception signal and the noise.

In the present embodiment, the IC chip 12 mounted at the center of the main surface 36 of the mounting substrate 30 also serves as an external connection member (see FIG. 2). Therefore, an external connection member having a relatively large area can be secured at the center of the main surface 36 of the mounting substrate 30. This makes it possible to secure sufficient mechanical connection strength between the external connection member and a connection partner (for example, a substrate).

In the present embodiment, the IC chip 12 is also used as an external connection member that is a ground terminal, but may also be used as an external connection member that is a hot terminal. In this case, in the IC chip 12, the connection terminal 122 connected to the conductor layer 124 through the through-via 123 includes the hot terminal. In this case, the conductor layer 124 of the IC chip 12 is not connected to the ground. The above hot terminal of the IC chip 12 is connected to a hot electrode of the mounting substrate 30 through the connection member 125. The hot electrode is, for example, an electrode to which a voltage is applied to flow a signal, and is not connected to the ground layer of the mounting substrate 30.

(2-6) Manufacturing Method of High-Frequency Module

A method of manufacturing the high-frequency module 1 will be described with reference to FIG. 4A to FIG. 4C.

Figure 4A:
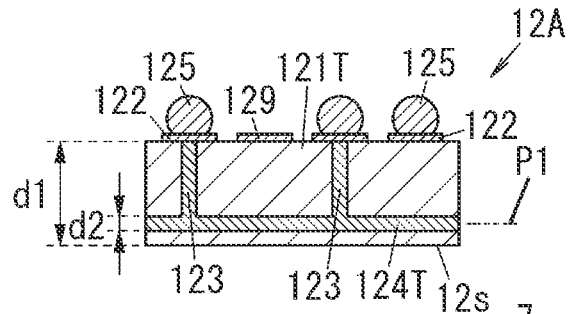
FIG. 4A to FIG. 4C are explanatory diagrams explaining a manufacturing procedure of the above high-frequency module.

First, as illustrated in FIG. 4A, a semi-finished product 12A of the IC chip 12 that is also used as an external connection member is manufactured. The semi-finished product 12A of the IC chip 12 is a product that is in the middle of manufacturing. The semi-finished product 12A includes a chip body 121T, the connection terminal 122, a conductor layer 124T, the connection member 125, the through-via 123, and the functional unit 129. A thickness d1 of the chip body 121T is thicker than a thickness of the chip body 121 (see FIG. 3) of the IC chip 12 as a finished product. The conductor layer 124T is provided inside the chip body 121T. A thickness d2 of the conductor layer 124T is thicker than the thickness of the conductor layer 124 (see FIG. 3) of the IC chip 12 as a finished product. The connection terminal 122, the through-via 123, the connection member 125, and the functional unit 129 of the semi-finished product 12A are formed in the same manner as the connection terminal 122, the through-via 123, the connection member 125, and the functional unit 129 of the IC chip 12 as a finished product.

That is, the semi-finished product 12A has the same configuration as that of the IC chip 12 as a finished product except that the chip body 121T is formed to have an extra thickness, the conductor layer 124T is formed inside the chip body 121T, and the thickness of the conductor layer 124T is formed to have an extra thickness, as compared with the IC chip 12 as a finished product. Therefore, in the semi-finished product 12A, when a portion of the semi-finished product 12A on a main surface 12s side is ground from the middle (two-dot chain line P1 in FIG. 4A) of the conductor layer 124T in the thickness direction so as to expose the conductor layer 124T, the remaining portion of the conductor layer 124T becomes the conductor layer 124 as a finished product, the remaining portion of the chip body 121T becomes the chip body 121 as a finished product, and thus, the semi-finished product 12A becomes the IC chip 12 as a finished product.

Figure 4B:
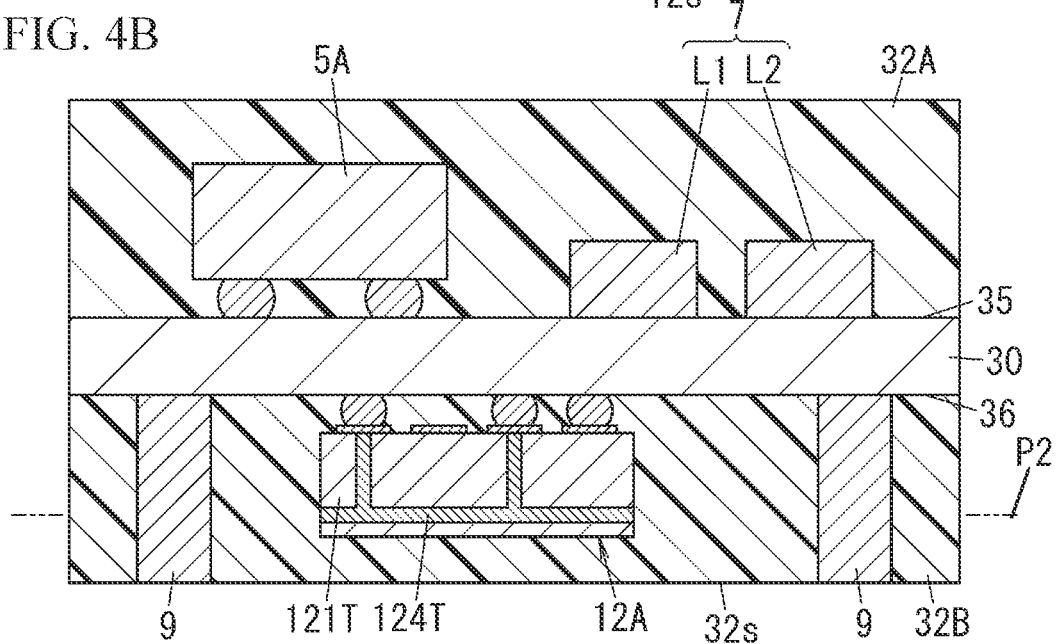

Next, as illustrated in FIG. 4B, the semi-finished product 12A is mounted on the main surface 36 of the mounting substrate 30. In addition, the electronic component 31 and the external connection member 9 other than the semi-finished product 12A are also mounted on the main surface 36 of the mounting substrate 30. Then, the resin layer 32B is provided on the main surface 36 of the mounting substrate 30 so as to cover the external connection member 9 and the semi-finished product 12A. At this time, the entire semi-finished product 12A is covered with the resin layer 32B. Note that the electronic components 31 (the reception filters 5A to 5C, the inductors L1 and L2 of the matching circuit 7, and the like) are also mounted on the main surface 35 of the mounting substrate 30, and the resin layer 32A is provided on the main surface 35 of the mounting substrate 30 so as to cover the electronic components 31.

Figure 4C:
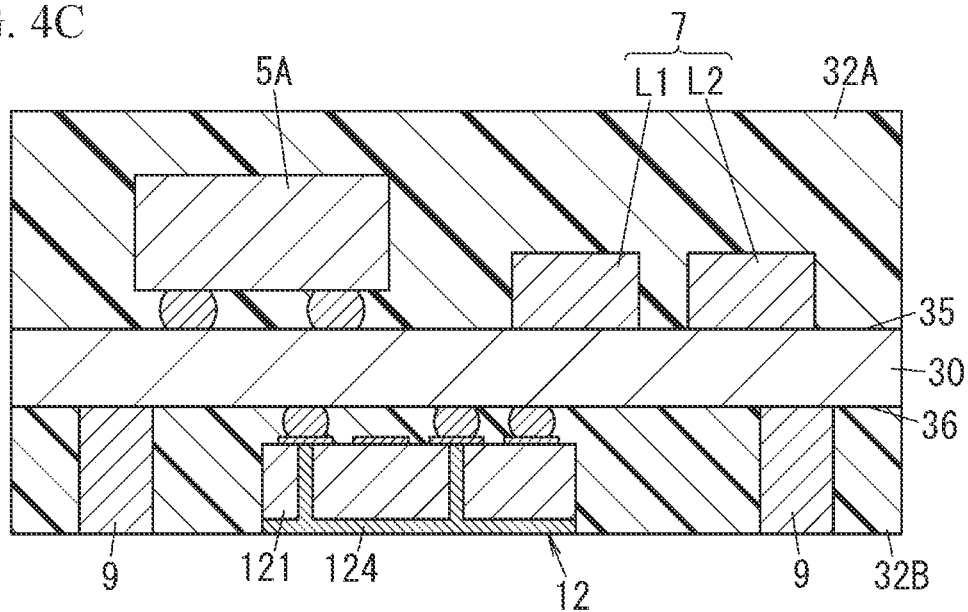

Then, as illustrated in FIG. 4B and FIG. 4C, in the resin layer 32B, a portion of the resin layer 32B on a main surface 32s side is ground from the middle (two-dot chain line P2 in FIG. 4B) of the resin layer 32B in the thickness direction to expose the conductor layer 124T. As a result, the conductor layer 124T is exposed from the main surface 32s of the resin layer 32B, and the semi-finished product 12A becomes the IC chip 12 as a finished product. In this way, the high-frequency module 1 is manufactured. Note that plating may be performed on the exposed main surface of the conductor layer 124T.

(3) Main Effects

As described above, the high-frequency module 1 according to the embodiment includes the mounting substrate 30, the IC chip 12 (electronic component), and the resin layer 32B. The mounting substrate 30 has the main surface 35 (second main surface) and the main surface 36 (first main surface) facing each other. The IC chip 12 is mounted on the main surface 36 of the mounting substrate 30. The resin layer 32B is provided on the mounting substrate 30 so as to cover the side surface of the IC chip 12. The IC chip 12 includes the chip body 121 (electronic component body), at least one connection terminal 122, the conductor layer 124, and the through-via 123. The chip body 121 has the main surface 126 (third main surface) and the main surface 127 (fourth main surface). The main surface 126 is a main surface on the mounting substrate 30 side. The main surface 127 is a main surface on a side opposite to the mounting substrate 30. At least one connection terminal 122 is provided on the main surface 126 of the chip body 121 and is connected to the mounting substrate 30 through the connection member 125. The conductor layer 124 is provided on the main surface 127 of the chip body 121. The through-via 123 penetrates the chip body 121 and connects the connection terminal 122 and the conductor layer 124.

According to this configuration, the IC chip 12 can also serve as an external connection member by connecting an external circuit to the conductor layer 124. Thus, by using the IC chip 12 also as the external connection member in this manner, the external connection member can be provided on the mounting substrate 30 without newly securing an arrangement space for the external connection member. As a result, the high-frequency module 1 can be reduced in size while securing the number of external connection members.

(4) Modification

A modification of Embodiment 1 will be described.

(4-1) Modification 1

Figure 5A:
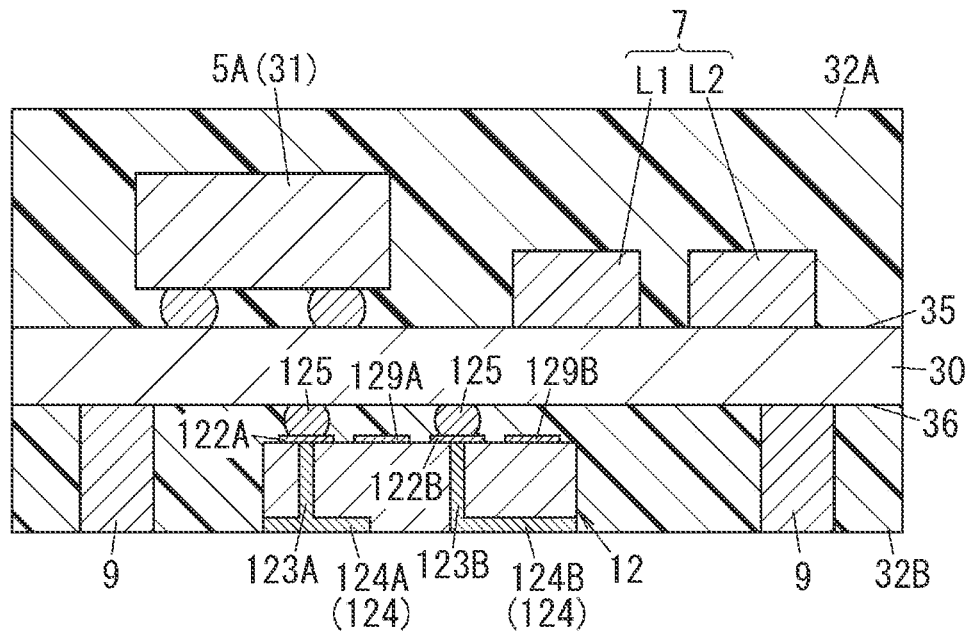
FIG. 5A is a cross-sectional view of a high-frequency module according to Modification 1 of Embodiment 1.
Figure 5B:
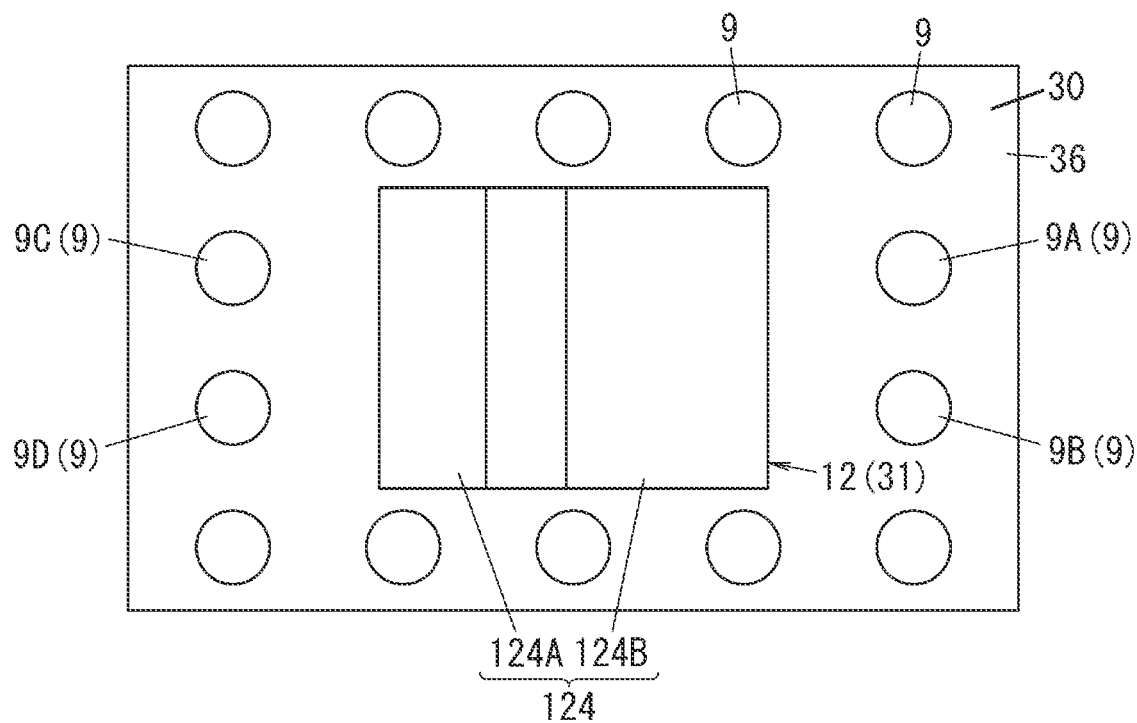
FIG. 5B is a plan view of the above high-frequency module.

In this modification, as illustrated in FIG. 5A and FIG. 5B, the conductor layer 124 of the IC chip 12 in Embodiment 1 includes a plurality of (two in the illustrated example) conductor portions 124A and 124B that are separated from each other. In addition, in this modification, the IC chip 12 includes a plurality of (two in the illustrated example) functional units 129A and 129B having different functions. The functional units 129A and 129B are portions that constitute circuits including integrated circuits (ICs). The number of the plurality of functional units 129A and 129B is, for example, the same as the number of the plurality of conductor portions 124A and 124B. That is, the conductor layer 124 is divided into the plurality of conductor portions 124A and 124B in accordance with the number of the plurality of functional units 129A and 129B.

The plurality of functional units 129A and 129B is electrically connected to mutually different conductor portions among the plurality of conductor portions 124A and 124B. More specifically, in the present embodiment, a connection terminal 122A is a connection terminal of the functional unit 129A and is connected to the functional unit 129A. A connection terminal 122B is a connection terminal of the functional unit 129B and is connected to the functional unit 129B. The functional unit 129A is electrically connected to the conductor portion 124A through the connection terminal 122A and a through-via 123A. The functional unit 129B is electrically connected to the conductor portions 124B through the connection terminal 122B and a through-via 123B. As described above, since the plurality of functional units 129A and 129B is electrically connected to the different conductor portions 124A and 124B, it is possible to prevent signals flowing through the functional units 129A and 129B from interfering with each other through the conductor layer 124.

The plurality of functional units 129A and 129B may include a radio frequency (RF) circuit portion and a digital circuit portion. The FR circuit portion is a functional unit constituting a circuit for processing an RF signal (reception signal and transmission signal). The digital circuit portion is a functional unit constituting a circuit for processing a digital signal. In this case, the RF circuit portion and the digital circuit portion can be connected to the different conductor portions 124A and 124B of the conductor layer 124. Thus, the signals of the RF circuit portion and the digital circuit portion can be prevented from interfering with each other through the conductor layer 124.

In addition, the plurality of functional units 129A and 129B may include a transmission circuit portion and a reception circuit portion. The transmission circuit portion is a circuit portion constituting a circuit related to the transmission of a transmission signal, and is an example of a functional unit of the transmission system. The transmission circuit portion may be, for example, a functional unit constituting a transmission filter that passes a specific frequency band in the transmission signal. The reception circuit portion is a circuit portion constituting a circuit related to the reception of a reception signal, and is an example of a functional unit of the reception system. The reception circuit portion may be a functional unit constituting a reception filter that passes a specific frequency band of the reception signal. Accordingly, the transmission circuit portion and the reception circuit portion can be connected to the different conductor portions 124A and 124B of the conductor layer 124. Thus, the signals processed by the transmission circuit portion and the reception circuit portion can be prevented from interfering with each other through the conductor layer 124.

(4-2) Other Modifications

In Embodiment 1, the IC chip 12 is also used as an external connection member, however, the electronic component 31 other than the IC chip 12 (for example, the reception filters 5A to 5C or the transmission filter) may also be used as the external connection member.

In addition, in the present embodiment, a double-sided component mounting structure in which electronic components are mounted on the main surfaces 35 and 36 on both sides of the mounting substrate 30 is adopted, but a single-sided component mounting structure in which an electronic component is mounted on only one main surface of the mounting substrate 30 may be adopted.

Embodiment 2

(1) Detailed Description

In the present embodiment, an example will be given in which when an acoustic wave filter is also used as an external connection member, the configuration of the external connection member provided in the acoustic wave filter is used for securing the ground of the acoustic wave filter. Hereinafter, the high-frequency module 1 and the communication device 100 according to the present embodiment will be described in detail with reference to FIG. 6 to FIG. 8C.

Figure 6:
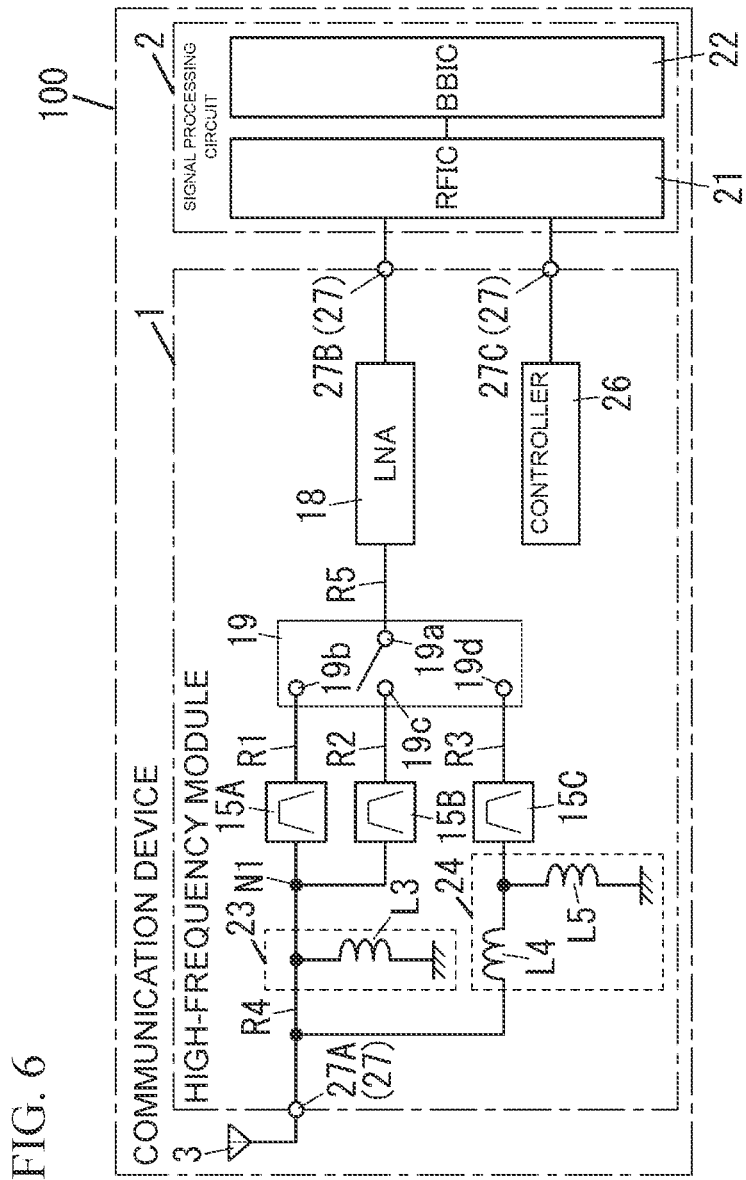
FIG. 6 is a block diagram of a high-frequency module and a communication device according to Embodiment 2.

As illustrated in FIG. 6, the communication device 100 according to the present embodiment includes the high-frequency module 1, the signal processing circuit 2, and the antenna 3 as in the case of Embodiment 1. In the present embodiment, the number of antennas 3 is one, for example. In addition, the signal processing circuit 2 of the present embodiment includes the RF signal processing circuit 21 and the baseband signal processing circuit 22 in the same manner as the signal processing circuit 2 of Embodiment 1. Since the RF signal processing circuit 21 and the baseband signal processing circuit 22 of the present embodiment have the same configurations as the RF signal processing circuit 21 and the baseband signal processing circuit 22 of Embodiment 1, the detailed description thereof will be omitted.

(2) Circuit Configuration of High-Frequency Module

The high-frequency module 1 of the present embodiment is, for example, a reception-system module that receives a reception signal. As illustrated in FIG. 6, the high-frequency module 1 according to the present embodiment transmits a high-frequency signal (for example, a reception signal) between the antenna 3 and the signal processing circuit 2.

The high-frequency module 1 includes a plurality of (three in the illustrated example) reception filters 15A to 15C, a low noise amplifier 18, a switch 19, matching circuits 23 and 24, a controller 26, and a plurality of (three in the illustrated example) external connection members 27. In addition, the high-frequency module 1 also includes the signal paths R1 to R3 and signal paths R4 and R5 for reception signals.

The plurality of external connection members 27 includes an antenna terminal 27A, a signal output terminal 27B, and an input terminal 27C. The antenna terminal 27A is a terminal to which the antenna 3 is connected. The signal output terminal 27B is a terminal for outputting the reception signal processed by the high-frequency module 1 to the signal processing circuit 2, and is connected to the input portion of the signal processing circuit 2. The input terminal 27C is a terminal to which the control signal from the signal processing circuit 2 is inputted, and is connected to the output portion of the signal processing circuit 2.

The signal paths R1 and R2 are signal paths connecting the branch point N1 and selection terminals 19b and 19c of the switch 19, respectively. The reception filters 15A and 15B are provided in the signal paths R1 and R2, respectively. The signal path R4 is a signal path connecting the antenna terminal 27A and the branch point N1. The matching circuit 23 is provided in the signal path R4. The signal path R3 is a signal path connecting the antenna terminal 27A and a selection terminal 19d of the switch 19. The matching circuit 24 and the reception filter 15C are provided in the signal path R3. The signal path R5 is a signal path connecting a common terminal 19a of the switch 19 and the signal output terminal 27B. The low noise amplifier 18 is provided in the signal path R5.

The switch 19 is a switch for connecting a connection destination of the signal path R5 from the three signal paths R1 to R3. The switch 19 is, for example, a switch integrated circuit (IC). The switch 19 includes the common terminal 19a and three selection terminals 19b to 19d. The common terminal 19a is connected to an input portion of the low noise amplifier 18 through the signal path R5. The three selection terminals 19b to 19d are connected to the output portion of the reception filters 15A to 15C through the signal paths R1 to R3, respectively. The switch 19 selects a connection destination of the common terminal 19a from the three selection terminals 19b and 19c in accordance with a control signal from the controller 26. The switch 19 performs, for example, one-to-one or one-to-many connection.

The reception filters 15A to 15C are provided in the signal paths R1 to R3, respectively. The reception filters 15A to 15C are filters that use reception bands (communication bands) of the first to third communication bands different from each other as pass bands. Each of the reception filters 15A to 15C includes an input portion and an output portion. The input portions of the reception filters 15A and 15B are connected to the branch point N1, and the input portion of the reception filter 15C is connected to the matching circuit 24. The output portions of the reception filters 15A to 15C are connected to the selection terminals 19b to 19d of the switch 19, respectively. The reception filters 15A to 15C limit the reception signals inputted to the input portions to signals in the reception bands of the first to third communication bands and output the signals from the output portions.

The reception filters 15A to 15C are, for example, acoustic wave filters. The acoustic wave filter is, for example, a surface acoustic wave (SAW) filter using a surface acoustic wave. Note that the reception filters 15A to 15C are not limited to the SAW filters and may be, for example, bulk acoustic wave (BAW) filters other than the SAW filters.

The matching circuit 23 is provided in the signal path R4 (that is, between the antenna terminal 27A and the branch point N1). The matching circuit 23 is a circuit for the impedance matching between the antenna 3 and the reception filters 15A and 15B. The matching circuit 23 includes, for example, an inductor L3 connected between the signal path R4 and the ground. The matching circuit 24 is provided in the signal path R3 between the antenna terminal 27A and the reception filter 15C. The matching circuit 24 is a circuit for the impedance matching between the antenna 3 and the reception filter 15C. The matching circuit 24 includes, for example, inductors L4 and L5. The inductor L4 is connected in series with the signal path R3, and the inductor L5 is connected between the signal path R3 and the ground.

The low noise amplifier 18 is provided in the signal path R5. The low noise amplifier 18 has an input portion and an output portion. The input portion of the low noise amplifier 18 is connected to the common terminal 19a of the switch 19, and the output portion of the low noise amplifier 18 is connected to the signal output terminal 27B. The low noise amplifier 18 amplifies the reception signal inputted to the input portion and outputs the amplified signal from the output portion. The low noise amplifier 18 is controlled by a control signal from the controller 26.

The controller 26 is a control device that controls electronic components such as the switch 19, the low noise amplifier 18 and the like in accordance with a control signal from the signal processing circuit 2. The controller 26 is electrically connected to the electronic components described above. In addition, the controller 26 is connected to the output portion of the signal processing circuit 2 through the input terminal 27C. The controller 26 controls the above-described electronic components in accordance with the control signal inputted to the input terminal 27C from the signal processing circuit 2.

(3) Operation of Communication Device

The operation of the communication device 100 of the present embodiment will be described with reference to FIG. 6.

In the communication device 100, one or more signal paths (for example, signal paths R1 to R3) connected to the signal path R5 are selected from the three signal paths R1 to R3 by the switch 19. When the antenna 3 receives a reception signal in this selected state, the reception signal flows from the antenna 3 to the signal paths R4 and R1, is sequentially processed by each of the electronic components (that is, the matching circuit 23 and the reception filter 15A), and flows to the signal path R5. In addition, the reception signal flows from the antenna 3 to the signal paths R4 and R2, is sequentially processed by each of the electronic components (that is, the matching circuit 23 and the reception filter 15B), and flows to the signal path R5. In addition, the reception signal flows from the antenna 3 to the signal path R3, is sequentially processed by each of the electronic components (that is, the matching circuit 24 and the reception filter 15C), and flows to the signal path R5. Then, each of the reception signals flowing through these three paths is summed up in the signal path R5. The summed reception signal flows through the signal path R5, is processed by the low noise amplifier 18, and is outputted from the signal output terminal 27B to the signal processing circuit 2.

(4) Structure of High-Frequency Module

The structure of the high-frequency module 1 of the present embodiment will be described with reference to FIG. 7.

Figure 7:
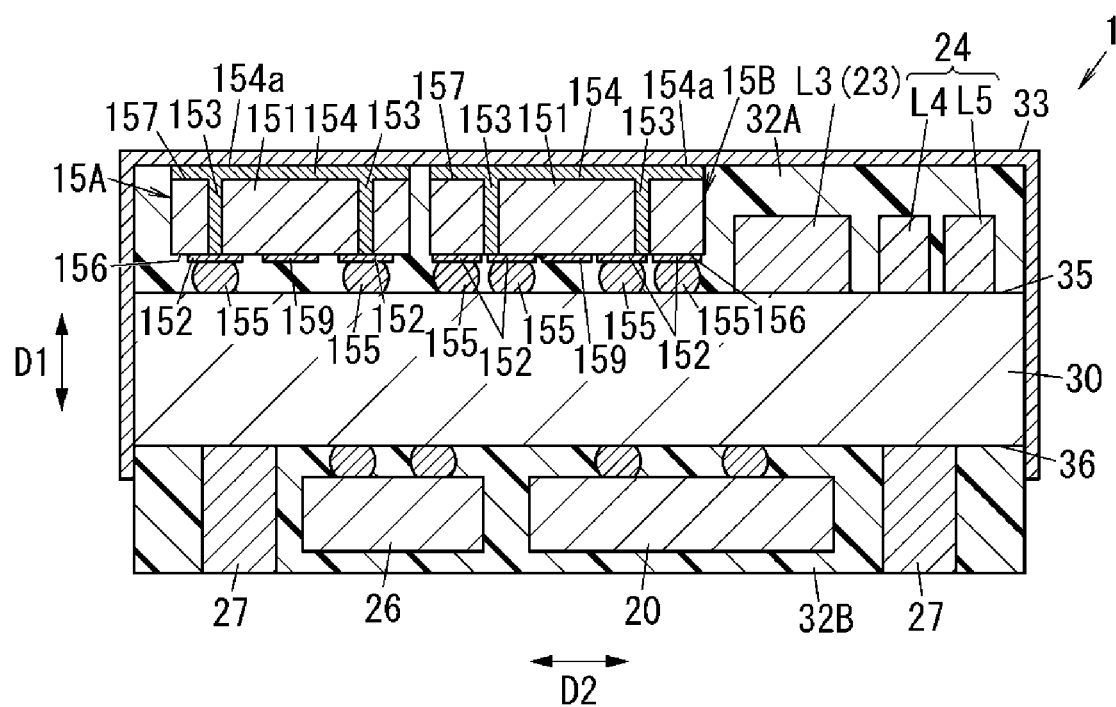
FIG. 7 is a cross-sectional view of the above high-frequency module.

As illustrated in FIG. 7, the high-frequency module 1 includes the mounting substrate 30, the plurality of electronic components 31, the resin layers 32A and 32B, and a shield layer 33.

The mounting substrate 30 is a substrate for mounting the plurality of electronic components 31, and has, for example, a rectangular plate shape. The mounting substrate 30 is configured in the same manner as the mounting substrate 30 of Embodiment 1. The mounting substrate 30 has the main surface 35 (second main surface) and the main surface 36 (first main surface) facing each other in the thickness direction D1 of the mounting substrate 30. The main surfaces 35 and 36 have, for example, a rectangular shape.

In the following description, the thickness direction D1 of the mounting substrate 30 may be referred to as the first direction D1. In addition, a certain direction orthogonal to the first direction D1 is referred to as the second direction D2. In addition, on the drawing in FIG. 7, the upper side and the lower side in the first direction D1 may be simply referred to as an "upper side" and a "lower side", and the left side and the right side in the second direction D2 may be simply referred to as a "left side" and a "right side".

The plurality of electronic components 31 is mounted on the main surfaces 35 and 36 on both sides of the mounting substrate 30. More specifically, the plurality of electronic components 31 includes the reception filters 15A to 15C and the inductors L3 to L5 of the matching circuits 23 and 24. These electronic components 31 are mounted on the main surface 35 of the mounting substrate 30. Note that FIG. 7 illustrates only the reception filters 15A and 15B and the inductors L3 to L5 of the matching circuits 23 and 24 among the electronic components 31.

In addition, the plurality of electronic components 31 includes the IC chip 20 and the controller 26. The IC chip 20 is an electronic component in which the low noise amplifier 18 (see FIG. 6) and the switch 19 (see FIG. 6) are integrated into one chip. These electronic components 31 are mounted on the main surface 36 of the mounting substrate 30.

The resin layer 32A is provided on the main surface 35 of the mounting substrate 30. The resin layer 32A covers the plurality of electronic components 31 mounted on the main surface 35 of the mounting substrate 30. More specifically, in the reception filters 15A to 15C, the resin layer 32A exposes the upper surface and covers portions other than the upper surface (the side surface and the lower surface). In addition, the resin layer 32A covers the entire outer surfaces of the inductors L3 to L5 of the matching circuits 23 and 24.

The resin layer 32B is provided on the main surface 36 of the mounting substrate 30. The resin layer 32B covers the plurality of electronic components 31 mounted on the main surface 36 of the mounting substrate 30. More specifically, the resin layer 32B covers the entire outer surfaces of the IC chip 20 and the controller 26. In addition, in the external connection member 27, the resin layer 32B exposes the tip surface and covers portions other than the tip surface (the outer peripheral surface).

The resin layers 32A and 32B contain resin. However, the resin layers 32A and 32B may contain fillers in addition to the resin. The resin layers 32A and 32B may be made of the same material or different materials from each other.

The shield layer 33 is made of metal, for example. The shield layer 33 is provided on outer surfaces (outer peripheral surface and top surface (surface opposite to the mounting substrate 30 side)) of the resin layer 32A, the outer peripheral surface of the resin layer 32B, and the outer peripheral surface of the mounting substrate 30. The shield layer 33 covers at least a part (entire in FIG. 7) of outer surfaces (top surface (surface opposite to the mounting substrate 30 side) and outer peripheral surface) of the resin layer 32A, the entire outer peripheral surface of the mounting substrate 30, and at least a part (a part of outer peripheral surface in FIG. 7) of outer surfaces (top surface and outer peripheral surface) of the resin layer 32B. The shield layer 33 is in contact with the ground layer of the mounting substrate 30. Thus, in the high-frequency module 1, the potential of the shield layer 33 can be made equal to the potential of the ground layer (ground potential).

(5) Structure of Reception Filter

In the high-frequency module 1, one or more electronic components among the plurality of electronic components 31 are also used as external connection members. In the present embodiment, as an example, the reception filters 15A and 15B are also used as external connection members.

The structure of the reception filters 15A and 15B will be described below. However, since the reception filters 15A and 15B have the same structure, in the following description, the structure of the reception filter 15A will be mainly described, and with respect to the structure of the reception filter 15B, the same portions as the structure of the reception filter 15B will be denoted by the same reference numerals and the description thereof will be omitted.

The reception filter 15A includes a support substrate 151, a plurality of connection terminals 152, a functional unit 159, a plurality of through-vias 153, a conductor layer 154, and a plurality of connection members 155.

The support substrate 151 has, for example, a rectangular plate shape. The support substrate 151 is formed of a member (for example, resin) having insulating properties. The support substrate 151 has a main surface 156 (third main surface) and a main surface 157 (fourth main surface) facing each other. The main surface 156 is a main surface of the support substrate 151 on the mounting substrate 30 side. The main surface 157 is a main surface of the support substrate 151 on a side opposite to the mounting substrate 30 side.

The conductor layer 154 is a portion connected to a member (shield layer 33) different from the reception filter 15A. The conductor layer 154 is formed of a member (for example, metal) having conductivity. The conductor layer 154 is provided on the main surface 157 of the support substrate 151. In the present embodiment, the conductor layer 154 is provided on the entire main surface 157 of the support substrate 151. However, the conductor layer 124 may be provided on at least a part of the main surface 157 of the support substrate 151.

The functional unit 159 is a portion constituting a circuit including an IDT electrode (comb-shaped electrode). The functional unit 159 is provided on the main surface 156 of the support substrate 151. The functional unit 159 is connected to one or more (in the present embodiment, a plurality of) connection terminals 152 which are input/output terminals.

The connection terminal 152 is a portion electrically connected to the mounting substrate 30 through the connection member 155, and is, for example, a pad electrode. The plurality of connection terminals 152 includes a ground terminal and a hot terminal of the reception filter 15A. The ground terminal is a terminal for grounding. The hot terminal is, for example, a terminal to which a voltage is applied in order to flow a signal and is not connected to the ground.

The through-via 153 is a member that penetrates the support substrate 151 in a thickness direction and electrically connects the conductor layer 154 and the connection terminal 152. That is, the through-via 153 penetrates between the main surface 156 and the main surface 157 of the reception filter 5A. The through-via 153 is formed of a conductive member (for example, metal). The through-via 153 has, for example, a columnar shape. At least one among the plurality of connection terminals 152 is connected to the conductor layer 154 through the through-via 153, and the rest is not connected to the conductor layer 154. The connection terminal 152 connected to the conductor layer 154 through the through-via 153 is electrically connected to the mounting substrate 30 through the connection member 155. In the present embodiment, the reception filters 15A and 15B are also used as external connection members having ground terminals, for example. In this case, all the connection terminals 152 connected to the conductor layer 154 through the through-vias 153 are ground terminals, and are electrically connected to the ground layer of the mounting substrate 30 through the connection members 155.

The connection member 155 is a conductive member that connects the connection terminal 152 and the conductive pattern provided on the main surface 36 of the mounting substrate 30, and is, for example, a bump formed of solder.

In addition, in the present embodiment, the reception filter 15A has the main surface 156 and the main surface 157, but the main surface 156 and the main surface 157 are separated from each other in the thickness direction of the reception filter 15A and intersect the thickness direction of the reception filter 15A. The main surface 156 and the main surface 157 of the reception filter 15A are orthogonal to the thickness direction of the reception filter 15A in the example of FIG. 7, but may be surfaces that are not orthogonal to the thickness direction of the reception filter 15A, for example. In addition, the main surface 156 and the main surface 157 of the reception filter 15A may be flat surfaces or curved surfaces. In addition, the main surface 156 and the main surface 157 of the reception filter 15A may be formed with fine irregularities, concave portions, or convex portions. The reception filter 15A has a rectangular shape in a plan view from the thickness direction of the reception filter 15A, but the shape is not limited thereto and may be, for example, a square shape or a shape other than a square shape. In addition, the reception filter 15A has a rectangular shape in a side view from a direction orthogonal to the thickness direction of the reception filter 15A, but the shape is not limited thereto and may be, for example, a square shape or a shape other than a square shape.

The reception filters 15A and 15B configured as described above are mounted on the main surface 36 of the mounting substrate 30 through the connection member 155. Of the outer surfaces (upper surfaces (surfaces opposite to the mounting substrate 30 side), lower surfaces (surfaces on the mounting substrate 30 side), and side surfaces) of the reception filters 15A and 15B, a main surface 154s (that is, the above upper surface) of the conductor layer 154 is exposed by the resin layer 32A, and the portions (side surfaces and lower surfaces) other than a main surface 154a are covered by the resin layer 32A. The main surface 154a of the conductor layer 154 of each of the reception filters 15A and 15B is covered with the shield layer 33 and is in contact with (that is, electrically connected to) the main surface of the shield layer 33. Note that although the entire main surface 154a (outer surface) of the conductor layer 154 is in contact with the shield layer 33 in the present embodiment, at least a part of the main surface 154a of the conductor layer 154 may be in contact with the shield layer 33. In addition, although the entire main surface 154a (outer surface) of the conductor layer 154 is covered with the shield layer 33, at least a part of the main surface 154a of the conductor layer 154 may be covered with the shield layer 33.

In the reception filters 15A and 15B configured as described above, the conductor layer 154 is in contact with (electrically connected to) the shield layer 33. For this reason, the ground terminals (connection terminals 152) of the reception filters 15A and 15B are connected to the shield layer 33 through the through-via 153 and the conductor layer 154, and are connected to the ground layer of the mounting substrate 30 through the shield layer 33. As a result, the ground terminals (connection terminals 152) of the reception filters 15A and 15B are connected to the ground layer of the mounting substrate 30 without using a conductor pattern portion of the mounting substrate 30. Therefore, it is possible to suppress the deterioration of the characteristics of the reception filters 15A and 15B due to the parasitic capacitance and the parasitic inductance parasitic in the conductor pattern portion of the mounting substrate 30. That is, the reception filters 15A and 15B can be connected to the ground layer of the mounting substrate 30 without deteriorating the characteristics of the reception filters 15A and 15B.

In addition, by connecting the conductor layer 124 of the reception filters 15A and 15B to the shield layer 33, it is possible to improve the heat dissipation of the reception filters 15A and 15B. As a result, it is possible to prevent the characteristics of the reception filters 15A and 15B from deteriorating due to the heat generated in the reception filters 15A and 15B and to improve the characteristics of the reception filters 15A and 15B.

In general, the ground terminal of the acoustic wave filter is connected to the ground layer of the mounting substrate 30 through a conductor pattern portion (including a via of the mounting substrate 30) of the mounting substrate 30. For this reason, the characteristics (for example, attenuation characteristics) of the acoustic wave filter are likely to deteriorate due to the parasitic capacitance and the parasitic inductance generated in the above conductor pattern portion, and it is difficult to obtain the desired characteristics. Such deterioration of the characteristics tends to occur remarkably when handling frequencies equal to or higher than 1 GHz in modules such as multiplexers. However, as in the present embodiment, the ground of the reception filters 15A and 15B is secured by the connection between the conductor layers 154 of the reception filters 15A and 15B (acoustic wave filters) and the shield layer 33, so that the deterioration of the characteristics described above can be suppressed.

Further, in the present embodiment, the high-frequency module 1 achieves miniaturization by adopting a double-sided component mounting structure in which electronic components are mounted on the main surfaces 35 and 36 on both sides of the mounting substrate 30. Note that, generally, in the double-sided component mounting structure, since electronic components are mounted on both main surfaces of the mounting substrate, it is difficult to secure an external connection member on the mounting substrate. However, by using the reception filters 15A and 15B also as the external connection members as in the present embodiment, the high-frequency module 1 can be reduced in size while securing the external connection members.

Note that in the present embodiment, the grounds of the reception filters 15A and 15B are secured through the shield layer 33 as described above. Therefore, the connection terminal 152 connected to the conductor layer 154 through the through-via 153 need not be connected to the ground layer of the mounting substrate 30 through the connection member 155.

(6) Manufacturing Method of High-Frequency Module

A method of manufacturing the high-frequency module 1 of the present embodiment will be described with reference to FIG. 8A to FIG. 8C.

Figure 8A:
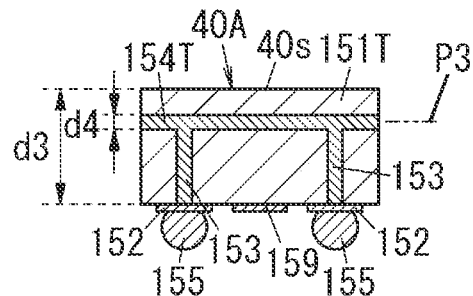
FIG. 8A to FIG. 8C are explanatory diagrams explaining a manufacturing procedure of the above high-frequency module.

First, as illustrated in FIG. 8A, a semi-finished product 40A of the reception filter 15A which is also used as an external connection member is manufactured. Note that although a semi-finished product 40B of the reception filter 15B is also manufactured, since the configuration of the semi-finished product 40B is the same as the configuration of the semi-finished product 40A, the same configurations as the configuration of the semi-finished product 40A are denoted by the same reference numerals and the description thereof is omitted.

The semi-finished product 40A includes a support substrate 151T, the connection terminal 152, a conductor layer 154T, the functional unit 159, the connection member 155, and the through-via 153. A thickness d3 of the support substrate 151T is thicker than the thickness of the support substrate 151 of the reception filter 15A. The conductor layer 154T is provided inside the support substrate 151T. A thickness d4 of the conductor layer 154T is thicker than the thickness of the conductor layer 154 of the reception filter 15A. The connection terminal 152, the functional unit 159, and the through-via 153 of the semi-finished product 40A are formed in the same manner as the connection terminal 152, the connection member 155, the functional unit 159, and the through-via 153 of the reception filter 15A.

That is, the semi-finished product 40A has the same configuration as that of the reception filter 15A as a finished product except that the support substrate 151T is formed to have an extra thickness, the conductor layer 154T is formed inside the support substrate 151T, and the conductor layer 154T is formed to have an extra thickness, as compared with the reception filter 15A as a finished product. Therefore, in the semi-finished product 40A, when a portion of the semi-finished product 40A on a main surface 40s side is ground from the middle (dotted line P3 in FIG. 4A) of the conductor layer 154T in the thickness direction so as to expose the conductor layer 154T, the remaining portion of the conductor layer 154T becomes the conductor layer 154, the remaining portion of the support substrate 151T becomes the support substrate 151, and thus, the semi-finished product 40A becomes the reception filter 15A as a finished product.

Figure 8B:
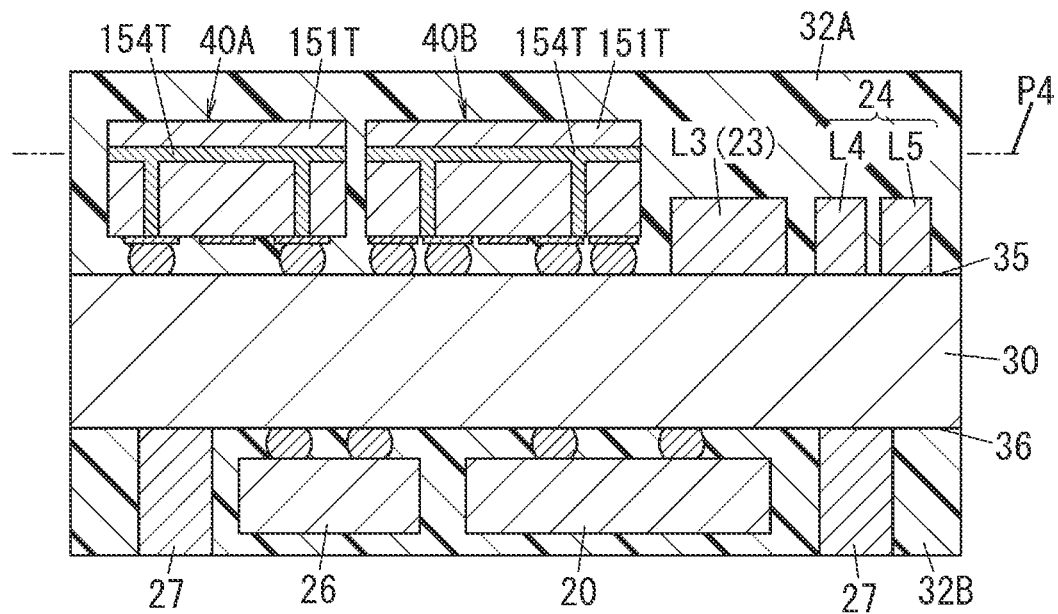

Next, as illustrated in FIG. 8B, the semi-finished products 40A and 40B are mounted on the main surface 35 of the mounting substrate 30 through the connection member 155. In addition, the electronic components 31 (for example, the matching circuits 23, 24) other than the semi-finished products 40A and 40B are also mounted on the main surface 35 of the mounting substrate 30. Then, the semi-finished products 40A and 40B and the matching circuits 23 and 24 mounted on the main surface 35 of the mounting substrate 30 are sealed by the resin layer 32A. At this time, the semi-finished products 40A and 40B are entirely covered with the resin layer 32A. Note that the electronic components 31 (the IC chip 20, the controller 26, and the external connection member 27) are also mounted on the main surface 36 of the mounting substrate 30, and the electronic components 31 are sealed with the resin layer 32B.

Figure 8C:
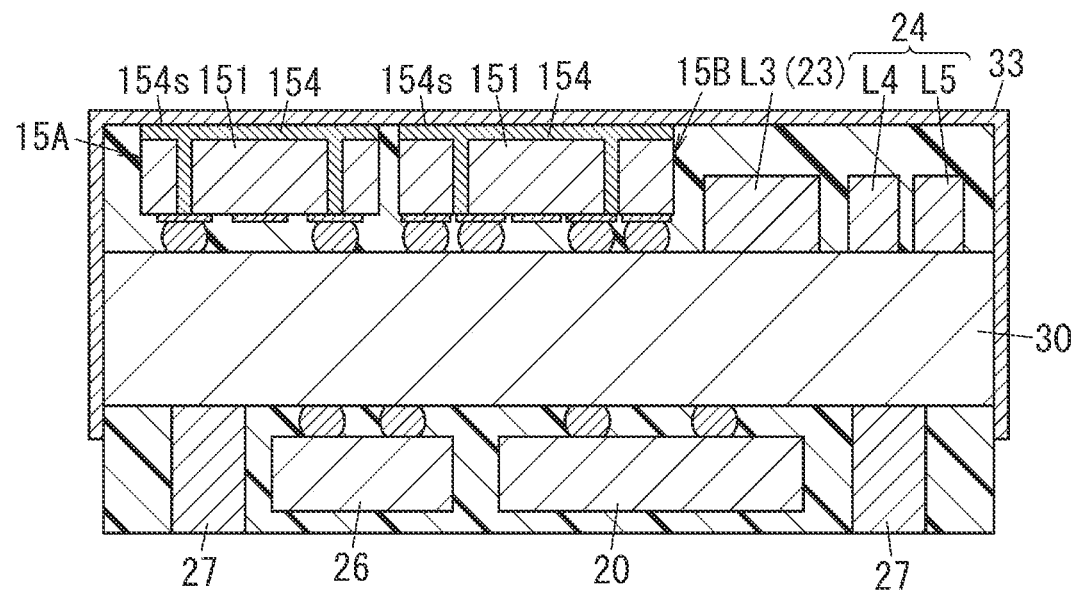

Then, as illustrated in FIG. 8C, in the resin layer 32A, a portion of the resin layer 32A on the main surface 32s side is ground from the middle (dotted line P4 in FIG. 8B) of the resin layer 32A in the thickness direction to expose the conductor layer 154T. As a result, the conductor layer 154T is exposed from the main surface 32s of the resin layer 32A, and the semi-finished products 40A and 40B become the reception filters 15A and 15B as finished products. Then, the shield layer 33 is formed so as to cover the entire outer surfaces (top surface and outer peripheral surfaces) of the resin layer 32A, the outer peripheral surface of the mounting substrate 30, and a part of the outer peripheral surface of the resin layer 32B. Thus, the main surface 154s of the conductor layer 154 of each of the reception filters 15A and 15B is covered with the shield layer 33 and is in contact with the shield layer 33. In this way, the high-frequency module 1 is manufactured.

(7) Main Effects

In the high-frequency module 1 according to the present embodiment, the electronic components 31 are the reception filters 15A and 15B (acoustic wave filters). The high-frequency module 1 includes the shield layer 33. The shield layer 33 covers at least a part (in the present embodiment, the entirety) of the outer surface of the resin layer 32A and at least a part (in the present embodiment, the entirety of the main surface 154s) of the outer surface of the conductor layer 154, and is electrically connected to the ground layer of the mounting substrate 30. The above-described at least a part (main surface 154s) of the outer surface of the conductor layer 154 is in contact with the shield layer 33.

According to this configuration, by bringing the conductor layers 154 of the reception filters 15A and 15B into contact with the shield layer 33, the reception filters 15A and 15B can be electrically connected to the ground layer of the mounting substrate 30. As a result, the reception filters 15A and 15B can be electrically connected to the ground layer without deteriorating the characteristics of the reception filters 15A and 15B.

That is, when the reception filters 15A and 15B are connected to the ground layer of the mounting substrate 30 through the connection member 155, the characteristics of the reception filters 15A and 15B are deteriorated due to the parasitic inductance and the parasitic capacitance generated in the conductive pattern portion connecting the connection member 155 and the ground layer. However, according to the above-described configuration, since the reception filters 15A and 15B are not connected to the shield layer 33 of the mounting substrate 30 through the connection member 155, the reception filters 15A and 15B are not affected by the parasitic inductance and the parasitic capacitance, and it is possible to suppress the deterioration in the characteristics of the reception filters 15A and 15B.

In the present embodiment, the connection terminal 152 connected to the conductor layer 154 through the through-via 153 is connected to the ground layer of the mounting substrate 30 through the connection member 155, but need not be connected to the ground layer of the mounting substrate 30 through the connection member 155. Even when the connection terminal 152 connected to the conductor layer 154 through the through-via 153 is connected to the ground layer of the mounting substrate 30 through the connection member 155 as in the present embodiment, the deterioration of the characteristics of the reception filters 15A and 15B due to the above-described parasitic inductance and the parasitic capacitance can be reduced as long as the grounds of the reception filters 15A and 15B are secured through the shield layer 33.

(8) Modification

A modification of Embodiment 2 will be described.

(8-1) Modification 1

Figure 9:
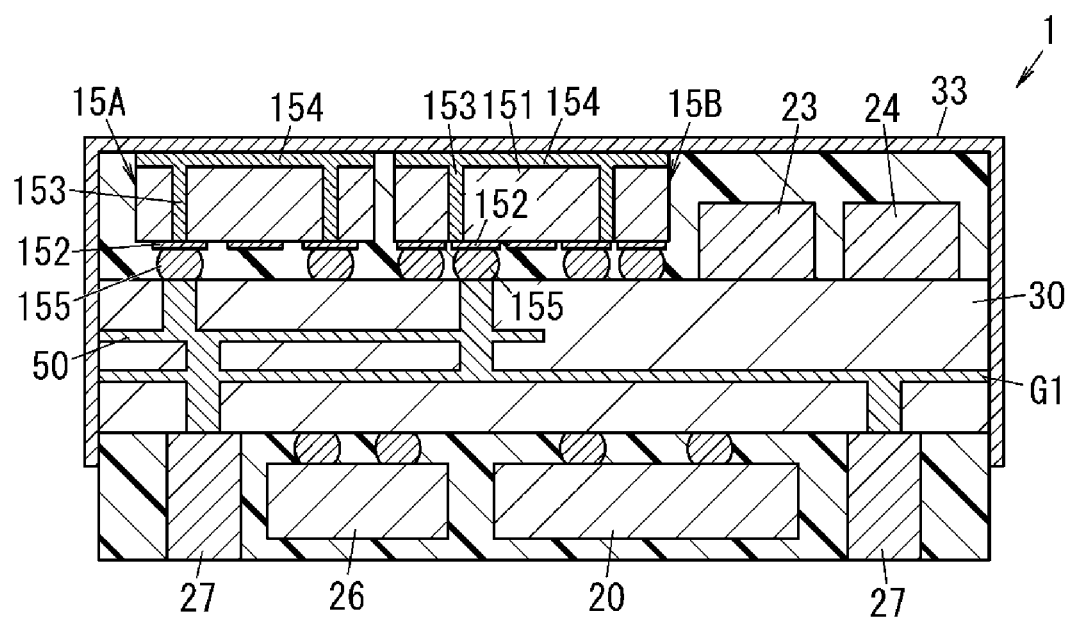
FIG. 9 is a cross-sectional view of a high-frequency module according to Modification 1 of Embodiment 2.

As illustrated in FIG. 9, in this modification, the mounting substrate 30 has a conductor pattern portion 50 constituting a notch filter in Embodiment 2. The conductor pattern portion 50 is, for example, a wiring that connects a ground layer G1 of the mounting substrate 30 and the connection member 155 connected to the conductor layer 154 through the through-via 153 and the connection terminal 152 in the reception filter 15A. That is, the connection terminal 152 connected to the conductor layer 154 through the through-via 153 is connected to the ground layer G1 of the mounting substrate 30 through the connection member 155 and the conductor pattern portion 50. Therefore, in this modification, the reception filter 15A is connected to the ground layer G1 of the mounting substrate 30 through the shield layer 33, and is also connected to the ground layer G1 of the mounting substrate 30 through the conductor pattern portion 50.

Figure 10:
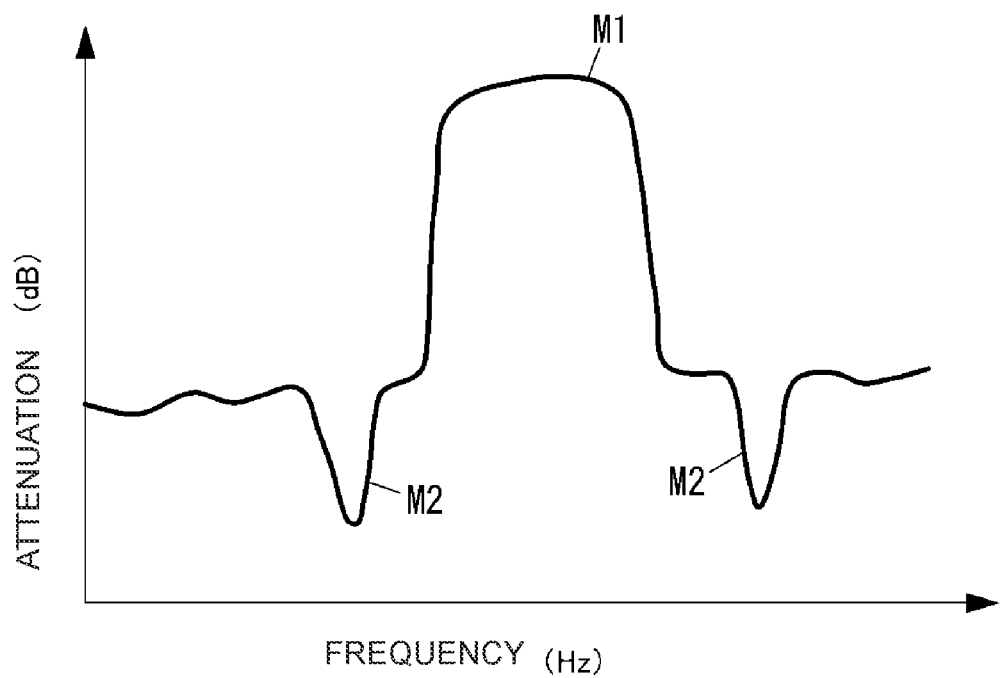
FIG. 10 is an explanatory diagram explaining a stop band of a notch filter included in the above high-frequency module.

As illustrated in FIG. 10, the notch filter described above has a stop band M2 on at least one of the high frequency side and the low frequency side of a pass band M1 of the reception filter 15A. In the example of FIG. 10, the stop band M2 is formed on both the high frequency side and the low frequency side of the pass band M1. In other words, the stop band M2 of the notch filter does not overlap the pass band M1 of the reception filter 15A and is formed in the vicinity thereof.

More specifically, the conductor pattern portion 50 has parasitic capacitance and parasitic inductance. The parasitic capacitance includes capacitance formed due to the physical structure of the conductor pattern portion 50 or capacitance formed between the conductor pattern portion 50 and another conductor pattern portion arranged near the conductor pattern portion 50. The parasitic inductance includes impedance formed due to the physical structure of the conductor pattern portion 50.

The above notch filter is constituted by the parasitic capacitance and the parasitic inductance of the conductor pattern portion 50. That is, the parasitic capacitance and the parasitic inductance of the conductor pattern portion 50 are formed such that the stop band M2 of the notch filter is arranged on at least one of the high frequency side and the low frequency side of the pass band M1 as described above.

According to this modification, the characteristics (for example, attenuation characteristics) of the reception filter 15A can be adjusted to more suitable characteristics by the notch filter formed by the conductor pattern portion 50. In addition, since the ground of the reception filter 15A is secured through two ways of the ground via the shield layer 33 and the ground via the conductor pattern portion 50, it is possible to strengthen the ground of the reception filter 15A.

Note that although this modification is applied to the reception filter 15A, this modification may be applied to the reception filter 15B.

(8-2) Modification 2

Figure 11:
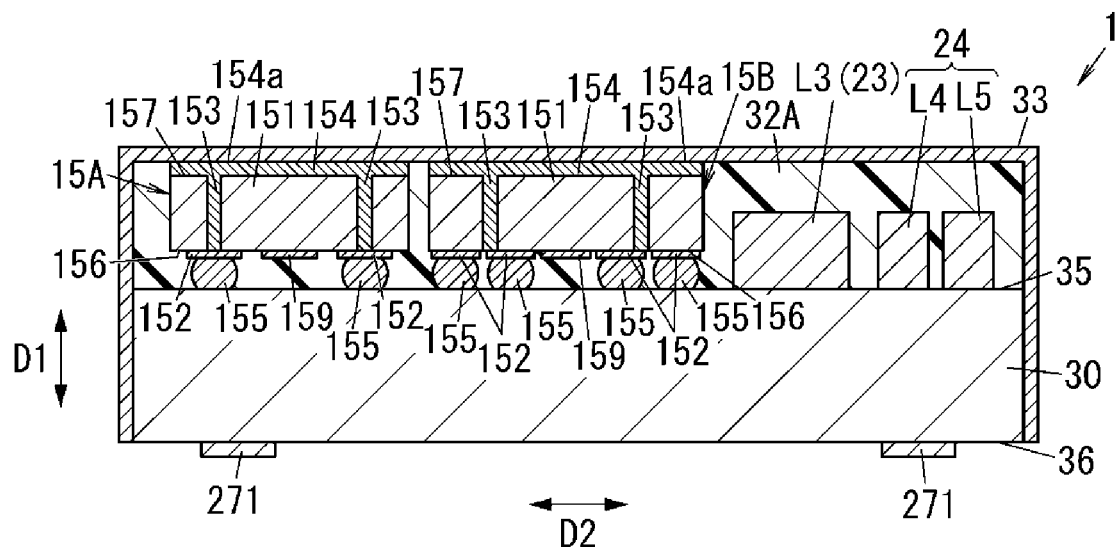
FIG. 11 is a cross-sectional view of a high-frequency module of Modification 2 of Embodiment 2.

In addition, although in the present embodiment, a double-sided component mounting structure in which electronic components are mounted on the main surfaces 35 and 36 on both sides of the mounting substrate 30 is adopted, a single-sided component mounting structure in which electronic components (reception filters 15A and 15B and matching circuit 24) are mounted only on one main surface (for example, main surface 35) of the mounting substrate 30 may be adopted as illustrated in FIG. 11. In this case, no electronic component is mounted on the main surface 35 of the mounting substrate 30, and a plurality of (two in the illustrated example) pads 271 for external connection electrically connected to the above electronic component is provided.

(8-3) Other Modifications

In Embodiment 2, the reception filters 15A and 15B are also used as the external connection member, but further, the reception filter 15C may also be used as the external connection member.

In addition, when the high-frequency module 1 includes a transmission filter, Embodiment 2 may be applied to the transmission filter.

Embodiment 3

(1) Detailed Description

Figure 12:
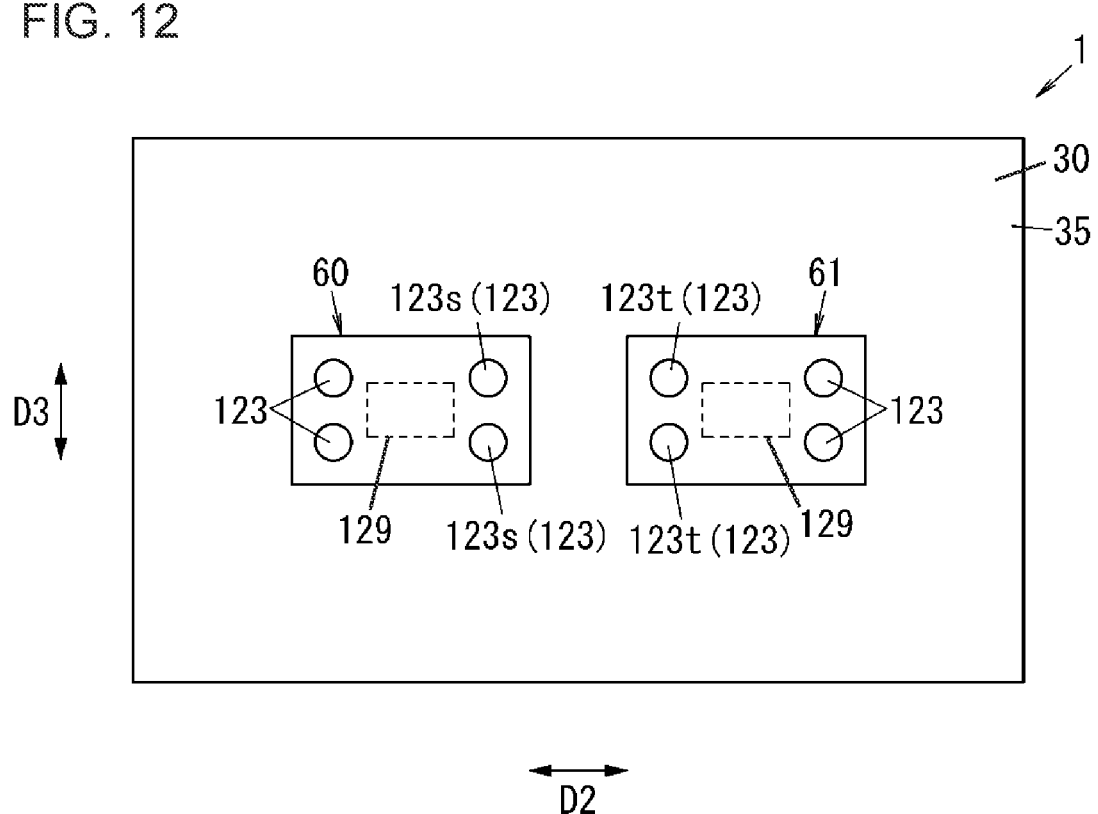
FIG. 12 is a plan view of a high-frequency module of embodiment 3.

Referring to FIG. 12, the present embodiment illustrates a case where the plurality of through-vias 123 (see FIG. 3) provided inside the electronic component 31 (for example, the IC chip 12 (see FIG. 3)) is used as electromagnetic shielding walls in Embodiment 1. Note that the electromagnetic shielding wall is a wall that is provided on the mounting substrate 30 and electromagnetically shields both sides of the wall.

In the high-frequency module 1 of the present embodiment, a reception filter 60 (first electronic component) and a transmission filter 61 (second electronic component) are mounted side by side in one direction (for example, the second direction D2) on the main surface 35 of the mounting substrate 30. The reception filter 60 and the transmission filter 61 are examples of electronic components different from each other.

Each of the reception filter 60 and the transmission filter 61 includes the conductor layer 124, the plurality of through-vias 123, the connection terminal 122, and the connection member 125 as in Embodiment 1, for example. The conductor layer 124 is connected to the ground layer of the mounting substrate 30 through the through-via 123, the connection terminal 122, and the connection member 125. That is, the through-via 123 is connected to the ground layer of the mounting substrate 30. Note that in the reception filter 60 and the transmission filter 61 illustrated in FIG. 12, only the through-via 123 among the conductor layer 124, the plurality of through-vias 123, the connection terminal 122, and the connection member 125 is illustrated.

The reception filter 60 includes at least one (a plurality of (for example, two) in the illustrated example) through-vias 123s. The plurality of through-vias 123s of the reception filter 60 is arranged in a portion (for example, an edge portion) of the reception filter 60 on the transmission filter 61 side in a plan view from the thickness direction D1 (see FIG. 3) of the mounting substrate 30. In other words, in the reception filter 60, the plurality of through-vias 123s of the reception filter 60 is arranged closer to the transmission filter 61 side than the functional unit 129 of the reception filter 60. Also, the transmission filter 61 includes a plurality of (two in the illustrated example) through-vias 123t. Like the plurality of through-vias 123s of the reception filter 60, the plurality of through-vias 123t is arranged in a portion (for example, an edge portion) of the transmission filter 61 on the reception filter 60 side in a plan view from the thickness direction D1 of the mounting substrate 30.

In addition, the plurality of through-vias 123s of the reception filter 60 is lined along a direction (for example, the third direction D3) intersecting (for example, orthogonal to) a direction (for example, the second direction D2) in which the reception filter 60 and the transmission filter 61 are lined in a plan view from the thickness direction D1 of the mounting substrate 30. In the plurality of through-vias 123s, an interval between the adjacent through-vias 123s is preferably smaller than the diameters of the through-vias 123s, and more preferably, the adjacent through-vias 123s are in contact with each other. The direction in which the plurality of through-vias 123t of the transmission filter 61 is lined and the interval between the adjacent through-vias 123t are also the same as in the case of the plurality of through-vias 123t of the reception filter 60.

In the reception filter 60 configured as described above, the plurality of through-vias 123s of the reception filter 60 function as electromagnetic shielding wall. Thus, (the functional unit 129 of) the reception filter 60 and the transmission filter 61 are electromagnetically shielded from each other. As a result, the reception filter 60 and the transmission filter 61 can be electromagnetically shielded from each other without newly providing an electromagnetic shielding wall. Similar to the reception filter 60, in the transmission filter 61, the plurality of through-vias 123t of the transmission filter 61 also function as an electromagnetic shielding wall. Accordingly, (the functional unit 129 of) the transmission filter 61 and the reception filter 60 are electromagnetically shielded from each other. As a result, the reception filter 60 and the transmission filter 61 can be electromagnetically shielded from each other without newly providing a shielding wall.

Note that the through-via 123 (that is, the through-via connected to the ground layer of the mounting substrate 30 through the connection member 125) of the electronic component 31 of Embodiment 1 is applied to the through-vias 123s and 123t of the reception filter 60 and the transmission filter 61 of the present embodiment. However, the through-via 153 of the electronic component 31 of Embodiment 2 (that is, the through-via connected to the ground layer of the mounting substrate 30 through the shield layer 33) may be applied to the through-vias 123s and 123t of the reception filter 60 and the transmission filter 61 of the present embodiment.

(2) Modification

Figure 13:
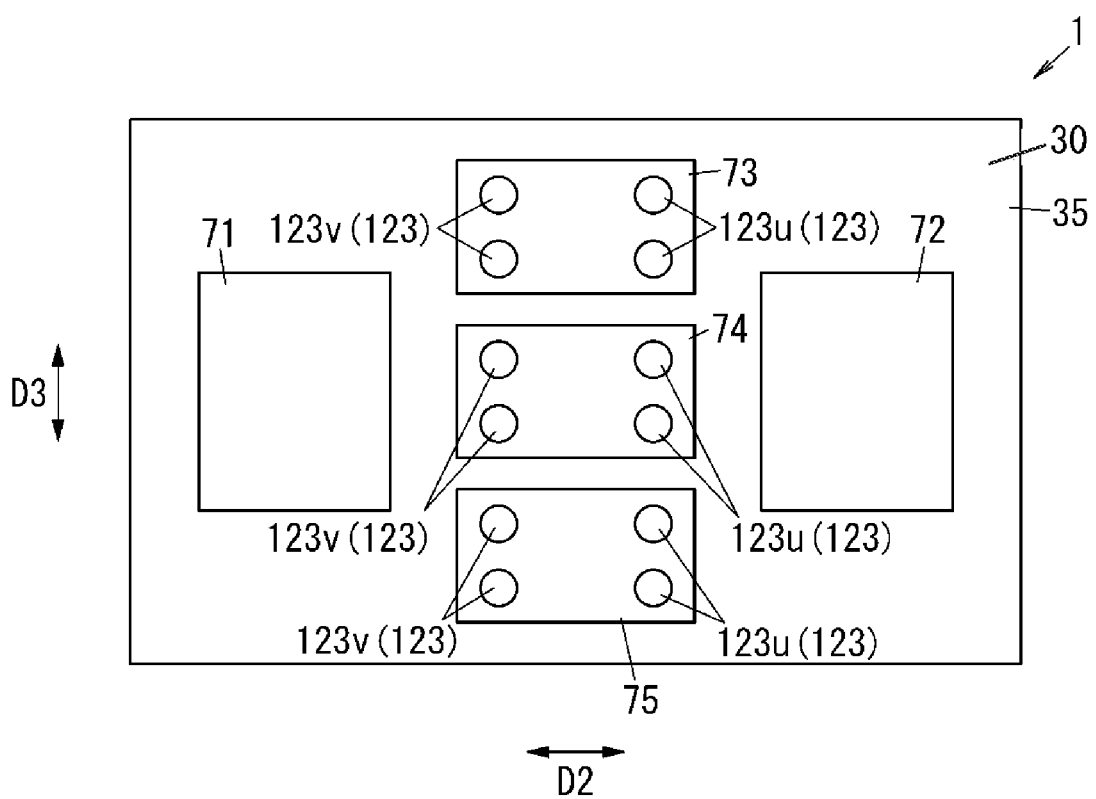
FIG. 13 is a plan view of a high-frequency module according to a modification of Embodiment 3.

A modification of Embodiment 3 will be described with reference to FIG. 13.

(2-1) Modification 1

In this modification, the electronic component 31 (for example, the reception filter 15A) including the through-via 123 in Embodiment 1 is arranged between the two electronic components 71 and 72, and thus the two electronic components 71 and 72 are electromagnetically shielded from each other by the through-via 123.

In the high-frequency module 1 of this modification, one or more (three in the illustrated example) reception filters 73 to 75 (first electronic component), and two electronic components 71 (second electronic component) and 72 (third electronic component) are mounted on the main surface 35 of the mounting substrate 30. The reception filters 73 to 75 have the same configuration as the reception filter 15A of Embodiment 1. That is, each of the reception filters 73 to 75 includes the plurality of through-vias 123. The plurality of through-vias 123 includes a plurality of through-vias 123u and a plurality of through-vias 123v. The two electronic components 71 and 72 are electronic components different from the reception filters 73 to 75 and are, for example, a power amplifier and a low noise amplifier.

The two electronic components 71 and 72 are arranged side by side in one direction (for example, the second direction D2). The three reception filters 73 to 75 are arranged between the two electronic components 71 and 72 in a plan view from the thickness direction D1 of the mounting substrate 30, and are lined in a direction (for example, the third direction D3) intersecting (for example, orthogonal to) a direction (for example, the second direction D2) in which the two electronic components 71 and 72 are lined in a plan view from the thickness direction D1 of the mounting substrate 30. Note that "the electronic component (for example, 73) is arranged between the electronic components 71 and 72 in a plan view from the thickness direction D1" means that at least one among a plurality of line segments connecting an arbitrary point in the region of the electronic component 71 and an arbitrary point in the region of the electronic component 72 passes through the region of the electronic component 73 on the main surface 35 intersecting the thickness direction D1. The plurality of through-vias 123u of each of the three reception filters 73 to 75 is lined in a direction (third direction D3) intersecting (for example, orthogonal to) a direction (second direction D2) in which the two electronic components 71 and 72 are lined in a plan view from the thickness direction D1 of the mounting substrate 30. In the present embodiment, the plurality of through-vias 123u of each of the reception filters 73 to 75 is provided in portions (edge portions) of the reception filters 73 to 75 on the electronic component 72 side.

In addition, the plurality of through-vias 123v of each of the three reception filters 73 to 75 is lined in a direction (third direction D3) intersecting (for example, orthogonal to) the direction (second direction D2) in which the two electronic components 71 and 72 are lined in a plan view from the thickness direction D1 of the mounting substrate 30. In the present embodiment, the plurality of through-vias 123v of each of the reception filters 73 to 75 is provided in portions (edge portions) of the reception filters 73 to 75 on the electronic component 71 side.

In this modification, it is possible to provide an electromagnetic shielding wall between the two electronic components 71 and 72 by the plurality of existing through-vias 123u of the reception filters 73 to 75. Thus, by using the existing plurality of through-vias 123u of the reception filters 73 to 75, it is possible to secure the electromagnetic insulation between the two electronic components 71 and 72 without newly providing an electromagnetic shielding wall. In addition, the electromagnetic shielding wall can also be provided between the two electronic components 71 and 72 by the plurality of existing through-vias 123v of the reception filters 73 to 75. Thus, by further using the existing plurality of through-vias 123v of the reception filters 73 to 75, it is possible to further secure the electromagnetic insulation between the two electronic components 71 and 72 without newly providing an electromagnetic shielding wall.

Note that the through-vias 123 of the electronic components 31 of Embodiment 1 (that is, the through-vias connected to the ground layer of the mounting substrate 30 through the connection members 125) are applied to the through-vias 123u and 123v of the reception filters 73 to 75 of this modification. However, the through-via 153 of the electronic component 31 of Embodiment 2 (that is, the through-via connected to the ground layer of the mounting substrate 30 through the shield layer 33) may be applied to the through-vias 123u and 123v of the reception filters 73 to 75 of this modification.

(2-2) Other Modifications

Embodiments 1 to 3 and their modifications may be combined and implemented.

(Aspects)

The following aspects are disclosed in this specification.

A high-frequency module (1) of a first aspect includes a mounting substrate (30), an electronic component (12; 15A), and a resin layer (32B; 32A). The mounting substrate (30) has a first main surface (36; 35) and a second main surface (35; 36) facing each other. The electronic component (12; 15A) is mounted on the first main surface (36; 35) of the mounting substrate (30). The resin layer (32B; 32A) is provided on the mounting substrate (30) and covers a side surface of the electronic component (12; 15A). The electronic component (12; 15A) has a third main surface (126; 156), a fourth main surface (127; 157), at least one connection terminal (122; 152), a conductor layer (124; 154), and a through-via (123; 153). The third main surface (126; 156) is a surface on the mounting substrate (30) side. The fourth main surface (127; 157) is a surface opposite to the mounting substrate (30) side. The connection terminal (122; 152) is provided on the third main surface (126; 156) of the electronic component (12; 15) on the mounting substrate (30) side, and is connected to the mounting substrate (30) through a connection member (125; 155). The conductor layer (124; 154) is provided on the fourth main surface (127; 157) of the electronic component (12; 15) opposite to the mounting substrate (30) side. The through-via (123; 153) penetrates between the third main surface (126; 156) and the fourth main surface (127; 157) to connect the connection terminal (122; 152) and the conductor layer (124; 154).

According to this configuration, the electronic component (12; 15A) can also serve as an external connection member (9; 27) by connecting an external circuit to the conductor layer (124; 154). Thus, by using the electronic component (12; 15A) also as the external connection member (9; 27), the external connection member (9; 27) can be provided on the mounting substrate (30) without newly securing an arrangement space for the external connection member (9; 27). As a result, it is possible to reduce the size of the high-frequency module (1) while securing the external connection member (9; 27).

In the high-frequency module (1) of a second aspect, in the first aspect, the electronic component (12; 15A) includes the plurality of connection terminals (122; 152). At least one among the plurality of connection terminals (122; 152) is connected to the conductor layer (124; 154) through the through-via (123; 153).

According to this configuration, at least one connection terminal (122; 152) among the plurality of connection terminals (122; 152) can be used for connection with the conductor layer (124; 154).

In the high-frequency module (1) of a third aspect, in the first or second aspect, the conductor layer (124) has a plurality of conductor portions (124A, 124B) provided on the fourth main surface (127) of the electronic component (12). The plurality of conductor portions (124A, 124B) is provided to be separated from each other.

According to this configuration, the conductor layer (124) can be configured by the plurality of conductor portions (124A, 124B) separated from each other.

In the high-frequency module (1) of a fourth aspect, in the third aspect, the electronic component (12) includes a plurality of functional units (129A, 129B) having functions different from each other. The plurality of functional units (129A, 129B) is connected to mutually different conductor portions among the plurality of conductor portions (124A, 124B).

According to this configuration, when the plurality of functional units (129A, 129B) having mutually different functions is connected to the conductor layer (124), signals flowing through the functional units (129A, 129B) can be prevented from interfering with each other through the conductor layer (124).

In the high-frequency module (1) of a fifth aspect, in the fourth aspect, the plurality of functional units (129A, 129B) includes an RF circuit portion that processes an RF signal and a digital circuit portion that processes a digital signal.

According to this configuration, the RF circuit portion and the digital circuit portion can be connected to the different conductor portions (124A, 124B) of the conductor layer (124). Thus, each of the signals of the RF circuit portion and the digital circuit portion can be prevented from interfering with each other through the conductor layer (124).

In the high-frequency module (1) of a sixth aspect, in the fourth aspect, the plurality of functional units (129A, 129B) includes a circuit portion of the transmission system and a circuit portion of the reception system.

According to this configuration, the circuit portion of the transmission system and the circuit portion of the reception system can be connected to the different conductor portions (124A, 124B) of the conductor layer (124). Thus, it is possible to prevent each of the signals of the circuit portion of the transmission system and the circuit portion of the reception system from interfering with each other through the conductor layer (124).

In the high-frequency module (1) of a seventh aspect, in any one of the first to sixth aspects, the mounting substrate (30) includes a ground layer (G1). The through-via (153) is electrically connected to the ground layer (G1) through the connection terminal (152) and the connection member (155).

According to this configuration, the electronic component (15A) mounted on the first main surface (35) of the mounting substrate (30) is connected to the ground layer (G1) of the mounting substrate (30) through the connection member (155) connected to the through-via (153). Thus, the propagation of the noise from the electronic component (15A) to the second main surface (36) side of the mounting substrate (30) can be suppressed, as a result, the electromagnetic shielding between the first main surface (35) side and the second main surface (36) side of the mounting substrate (30) can be secured.

The high-frequency module (1) of an eighth aspect, in any one of the first to seventh aspects, further includes a second electronic component (61) that is a component different from a first electronic component (60) as the electronic component (60) and is mounted on the first main surface (35) of the mounting substrate (30). In a plan view from a thickness direction (D1) of the mounting substrate (30), a through-via (123s) is arranged in a portion of the first electronic component (60) on the second electronic component (61) side.

According to this configuration, an electromagnetic shielding wall can be provided between the first electronic component (60) and the second electronic component (61) by at least one existing through-via (123s) in the first electronic component (60). Thus, by using the at least one existing through-via (123s) in the first electronic component (60), it is possible to secure the magnetic shielding between the first electronic component (60) and the second electronic component (61) without newly providing an electromagnetic shielding wall.

The high-frequency module (1) of a ninth aspect, in the eighth aspect, includes the plurality of through-vias (123s). The plurality of through-vias (123s) is lined along a direction (D3) intersecting a direction (D2) in which the first electronic component (60) and the second electronic component (61) are lined in a plan view from the thickness direction (D1) of the mounting substrate (30).

According to this configuration, since the electromagnetic shielding wall is formed by the plurality of through-vias (123s) lined along the direction (D3) intersecting the direction (D2) in which the first electronic component (60) and the second electronic component (61) are lined, it is possible to further secure the magnetic shielding between the first electronic component (60) and the second electronic component (61).

The high-frequency module (1) of a tenth aspect, in any one of the first to seventh aspects, further includes a second electronic component (71) and a third electronic component (72) that are components different from first electronic components (73 to 75) as the electronic components (73 to 75) and are mounted on the first main surface (35) of the mounting substrate (30). The high-frequency module (1) includes a plurality of through-vias (123u). The first electronic components (73 to 75) are arranged between the second electronic component (71) and the third electronic component (72) in a plan view from the thickness direction (D1) of the mounting substrate (30). In a plan view from the thickness direction (D1) of the mounting substrate (30), the plurality of through-vias (123u) is lined along the direction (D3) intersecting the direction (D2) in which the second electronic component (71) and the third electronic component (72) are lined.

According to this configuration, an electromagnetic shielding wall can be provided between the second electronic component (71) and the third electronic component (72) by the plurality of existing through-vias (123u) in the first electronic components (73 to 75). Thus, the electromagnetic shielding between the second electronic component (71) and the third electronic component (72) can be secured by using the plurality of existing through-vias (123u) in the first electronic components (73 to 75) without newly providing an electromagnetic shielding wall.

In the high-frequency module (1) of an eleventh aspect, in any one of the first to sixth aspects, the connection terminal (122) connected to the conductor layer (124) through the through-via (123) includes a terminal (122a) not connected to the ground layer (G1) of the mounting substrate (30).

According to this configuration, the electronic component (12) can also be used as the external connection member (9) which is a terminal not connected to the ground layer of the mounting substrate (30).

The high-frequency module (1) of a twelfth aspect, in any one of the first to eleventh aspects, further includes the external connection member (9) provided on the first main surface (36) of the mounting substrate (30).

According to this configuration, the present disclosure can be applied to the electronic component (12) mounted on the main surface (36) on which the external connection member (9) is provided of the main surfaces (35, 36) on both sides of the mounting substrate (30).

In the high-frequency module (1) of a thirteenth aspect, in the twelfth aspect, the conductor layer (124) is connectable to a ground electrode of an electric device in which the high-frequency module (1) is mounted.

According to this configuration, the electronic component (12) serving as the external connection member (9) can be connected to the ground electrode of the electric device in which the high-frequency module (1) is mounted. As a result, the ground of the mounting substrate (30) can be secured, whereby the deterioration of the characteristics of the electronic component (12) mounted on the mounting substrate (30) can be suppressed.

The high-frequency module (1) of a fourteenth aspect, in any one of the first to eleventh aspects, further includes the external connection member (27) provided on the second main surface (36) of the mounting substrate (30).

According to this configuration, the present disclosure can be applied to the electronic components (15A, 15B) mounted on the main surface (35) opposite to the main surface (36) on which the external connection member (27) is provided of the main surfaces (35, 36) on both sides of the mounting substrate (30).

In the high-frequency module (1) of a fifteenth aspect, in the fourteenth aspect, the other electronic components (5A to 5C) different from the electronic component (12) are mounted on the second main surface (35) of the mounting substrate (30).

According to this configuration, the present disclosure can be applied to a double-sided component mounting structure in which the electronic components (12, 5A to 5C) are mounted on the main surfaces (35, 36) on both sides of the mounting substrate (30).

The high-frequency module (1) of a sixteenth aspect, in any one of the first to tenth aspects, further includes a shield layer (33) covering at least a part of an outer surface of the resin layer (32A) and at least a part of an outer surface of the conductor layer (154). The mounting substrate (30) has the ground layer (G1). The electronic components (15A, 15B) are acoustic wave filters. The conductor layer (154) is in contact with the shield layer (33). The shield layer (33) is electrically connected to the ground layer (G1) of the mounting substrate (30).

According to this configuration, by bringing the conductor layer (154) of the electronic components (15A, 15B) serving as the acoustic wave filter into contact with the shield layer (33), the electronic components (15A, 15B) can be connected to the ground layer of the mounting substrate (30). As a result, the electronic components (15A, 15B) can be connected to the ground layer without deteriorating the characteristics of the electronic components (15A, 15B) serving as the acoustic wave filter.

In other words, when the electronic components (15A, 15B) serving as the acoustic wave filter are connected to the ground layer of the mounting substrate (30) through the connection member (155), the characteristics of the electronic components (15A, 15B) deteriorate due to the parasitic inductance and the parasitic capacitance generated in the conductor pattern portion (including via) connecting the connection member (155) and the ground layer. However, according to the above-described configuration, since the electronic components (15A, 15B) are not connected to the shield layer of the mounting substrate (30) through the connection member (125), the electronic components (15A, 15B) are not affected by the parasitic inductance and the parasitic capacitance, and the deterioration of the characteristics of the electronic components (15A, 15B) can be suppressed.

In the high-frequency module (1) of a seventeenth aspect, in the sixteenth aspect, the mounting substrate (30) further includes a conductor pattern portion (50). The connection terminal (152) is connected to the ground layer (G1) of the mounting substrate (30) through the connection members (155) and the conductor pattern portion (50) of the mounting substrate (30). The conductor pattern portion (50) constitutes a notch filter having a stop band (M2) on at least one of a high frequency side and a low frequency side of a pass band (M1) of the electronic component (15A) which is an acoustic wave filter.

According to this configuration, the parasitic inductance and the parasitic capacitance formed in the conductor pattern portion (50) are adjusted to form a notch filter, and the characteristics of the electronic component (15A) which is an acoustic wave filter can be improved by the notch filter.

A communication device (100) of an eighteenth aspect includes the high-frequency module (1) of any one of the first to seventeenth aspects, and a signal processing circuit (2). The signal processing circuit (2) is connected to the high-frequency module (1) and performs signal processing on the high-frequency signal.

According to this configuration, it is possible to provide the communication device (100) including the high-frequency module (1) having the above-described effects.

1 HIGH-FREQUENCY MODULE
2 SIGNAL PROCESSING CIRCUIT
3, 3A, 3B ANTENNA
4 FIRST SWITCH
4a, 4b COMMON TERMINAL
4c to 4e SELECTION TERMINAL
5A to 5C RECEPTION FILTER (ANOTHER ELECTRONIC COMPONENT)
15A to 15C RECEPTION FILTER
6 SECOND SWITCH
6a COMMON TERMINAL
6b to 6d SELECTION TERMINAL
7 MATCHING CIRCUIT
8, 18 LOW NOISE AMPLIFIER
9, 27 EXTERNAL CONNECTION MEMBER
9A, 9B, 27A ANTENNA TERMINAL
9C SIGNAL OUTPUT TERMINAL
9D, 27C INPUT TERMINAL
10, 26 CONTROLLER
12 IC CHIP (ELECTRONIC COMPONENT)
12A, 40A, 40B SEMI-FINISHED PRODUCT
12s, 40s MAIN SURFACE
19 SWITCH
19a COMMON TERMINAL
19b to 19d SELECTION TERMINAL
20 IC CHIP
21 RF SIGNAL PROCESSING CIRCUIT
22 BASEBAND SIGNAL PROCESSING CIRCUIT
23, 24 MATCHING CIRCUIT
30 MOUNTING SUBSTRATE
31 ELECTRONIC COMPONENT
32A, 32B RESIN LAYER
32s MAIN SURFACE
33 SHIELD LAYER
35 MAIN SURFACE (FIRST MAIN SURFACE, SECOND MAIN SURFACE)
36 MAIN SURFACE (FIRST MAIN SURFACE, SECOND MAIN SURFACE)
50 CONDUCTOR PATTERN PORTION
60 RECEPTION FILTER (FIRST ELECTRONIC COMPONENT)
61 TRANSMISSION FILTER (SECOND ELECTRONIC COMPONENT)
71 ELECTRONIC COMPONENT (SECOND ELECTRONIC COMPONENT)

72 ELECTRONIC COMPONENT (THIRD ELECTRONIC COMPONENT)
73 to 75 RECEPTION FILTER (FIRST ELECTRONIC COMPONENT)
100 COMMUNICATION DEVICE
121 CHIP BODY
122, 122A, 122B, 152 CONNECTION TERMINAL
123, 123A, 123B, 123s to 123v, 153 THROUGH-VIA
124, 124T, 154, 154T CONDUCTOR LAYER
124a, 154a, 154s MAIN SURFACE
124A, 124B CONDUCTOR PORTION
125, 155 CONNECTION MEMBER
126, 156 MAIN SURFACE (THIRD MAIN SURFACE)
127, 157 MAIN SURFACE (FOURTH MAIN SURFACE)
129, 129A, 129B, 159 FUNCTIONAL UNIT
151, 151T SUPPORT SUBSTRATE
D1 FIRST DIRECTION (THICKNESS DIRECTION)
D2 SECOND DIRECTION
D3 THIRD DIRECTION
G1 GROUND LAYER
L1 to L5 INDUCTOR
M1 PASS BAND
M2 STOP BAND
N1 BRANCH POINT
R0 to R5 SIGNAL PATH

The invention claimed is:

1. A high-frequency module comprising:
a mounting substrate having a first main surface and a second main surface facing each other;
a first electronic component mounted on the first main surface of the mounting substrate; and
a resin layer provided on the mounting substrate and covering a side surface of the first electronic component,
wherein the first electronic component includes:
a third main surface facing the mounting substrate;
a fourth main surface opposite to the third main surface;
at least one connection terminal provided on the third main surface and connected to the mounting substrate through a connection member;
a conductor layer provided on the fourth main surface; and
at least one through-via penetrating between the third main surface and the fourth main surface and connecting the connection terminal and the conductor layer.

2. The high-frequency module according to claim 1,
wherein the at least one connection terminal comprises a plurality of connection terminals, and
at least one among the plurality of connection terminals is connected to the conductor layer through the through-via.

3. The high-frequency module according to claim 1,
wherein the conductor layer includes a plurality of conductor portions provided on the fourth main surface of the first electronic component, and
the plurality of conductor portions is provided to be separated from each other.

4. The high-frequency module according to claim 3,
wherein the first electronic component includes a plurality of functional units having functions different from each other, and
the plurality of functional units is connected to mutually different conductor portions among the plurality of conductor portions.

5. The high-frequency module according to claim 4,
wherein the plurality of functional units includes an RF circuit portion configured to process an RF signal and a digital circuit portion configured to process a digital signal.

6. The high-frequency module according to claim 4,
wherein the plurality of functional units includes a transmission-system circuit portion and a reception-system circuit portion.

7. The high-frequency module according to claim 1,
wherein the mounting substrate includes a ground layer, and
the through-via is electrically connected to the ground layer through the connection terminal and the connection member.

8. The high-frequency module according to claim 1,
further comprising a second electronic component different from the first electronic component and mounted on the first main surface of the mounting substrate,
wherein in a plan view from a thickness direction of the mounting substrate, the through-via is arranged in a portion of the first electronic component facing the second electronic component.

9. The high-frequency module according to claim 8,
wherein the at least one through-via comprises a plurality of through-vias, and
the plurality of through-vias is lined along a direction intersecting a direction in which the first electronic component and the second electronic component are lined in a plan view from a thickness direction of the mounting substrate.

10. The high-frequency module according to claim 1,
further comprising a second electronic component and a third electronic component, the second electronic component and the third electronic component being different from the first electronic component and mounted on the first main surface of the mounting substrate,
wherein the at least one through-via comprises a plurality of through-vias,
the first electronic component is arranged between the second electronic component and the third electronic component in a plan view from a thickness direction of the mounting substrate, and
the plurality of through-vias is lined along a direction intersecting a direction in which the second electronic component and the third electronic component are lined in a plan view from a thickness direction of the mounting substrate.

11. The high-frequency module according to claim 1,
wherein the connection terminal connected to the conductor layer through the through-via includes a terminal not connected to a ground layer of the mounting substrate.

12. The high-frequency module according to claim 1,
further comprising an external connection member provided on the first main surface of the mounting substrate.

13. The high-frequency module according to claim 12,
wherein the conductor layer is connectable to a ground electrode of an electric device in which the high-frequency module is mounted.

14. The high-frequency module according to claim 1,
further comprising an external connection member provided on the second main surface of the mounting substrate.

15. The high-frequency module according to claim 14,
further comprising another electronic component different from the first electronic component and mounted on the second main surface of the mounting substrate.

16. The high-frequency module according to claim 1, further comprising a shield layer covering at least a part of an outer surface of the resin layer and at least a part of an outer surface of the conductor layer, wherein the mounting substrate includes a ground layer, the first electronic component is an acoustic wave filter, the conductor layer is in contact with the shield layer, and the shield layer is electrically connected to the ground layer of the mounting substrate.

17. The high-frequency module according to claim 16, wherein the mounting substrate further includes a conductor pattern portion, the connection terminal is connected to the ground layer of the mounting substrate through the connection member and the conductor pattern portion of the mounting substrate, and the conductor pattern portion constitutes a notch filter having a stop band on at least one of a high frequency side and a low frequency side of a pass band of the acoustic wave filter.

18. A communication device comprising:

the high-frequency module according to claim 1; and a signal processing circuit connected to the high-frequency module and configured to perform signal processing on a high-frequency signal.

19. The high-frequency module according to claim 2, wherein the conductor layer includes a plurality of conductor portions provided on the fourth main surface of the first electronic component, and the plurality of conductor portions is provided to be separated from each other.

20. The high-frequency module according to claim 2, wherein the mounting substrate includes a ground layer, and the through-via is electrically connected to the ground layer through the connection terminal and the connection member.

* * * * *